(12) United States Patent
Mizutani et al.

(10) Patent No.: US 12,483,682 B2
(45) Date of Patent: Nov. 25, 2025

(54) IMAGE PROCESSING SYSTEM, INFORMATION PROCESSING DEVICE, IMAGE CAPTURING DEVICE, AND IMAGE PROCESSING DEVICE

(71) Applicant: Sony Group Corporation, Tokyo (JP)

(72) Inventors: Shinnosuke Mizutani, Tokyo (JP); Kei Kakidani, Tokyo (JP)

(73) Assignee: Sony Group Corporation, Tokyo (JP)

( * ) Notice: Subject to any disclaimer, the term of this patent is extended or adjusted under 35 U.S.C. 154(b) by 887 days.

(21) Appl. No.: 17/771,325

(22) PCT Filed: Jul. 27, 2020

(86) PCT No.: PCT/JP2020/028727
§ 371 (c)(1),
(2) Date: Apr. 22, 2022

(87) PCT Pub. No.: WO2021/090541
PCT Pub. Date: May 14, 2021

(65) Prior Publication Data
US 2022/0377296 A1 Nov. 24, 2022

(30) Foreign Application Priority Data
Nov. 7, 2019 (JP) .................... 2019-202171

(51) Int. Cl.
*H04N 9/64* (2023.01)
*H04N 23/83* (2023.01)
(52) U.S. Cl.
CPC ............. *H04N 9/646* (2013.01); *H04N 23/83* (2023.01)

(58) Field of Classification Search
CPC ........ H04N 9/646; H04N 23/83; H04N 23/76; H04N 23/90; H04N 5/268; G09G 2320/0673; G09G 2320/08; G09G 5/10
See application file for complete search history.

(56) References Cited

U.S. PATENT DOCUMENTS 8,339,485 B2 * 12/2012 Endo .................... H04N 5/202
348/222.1
9,210,395 B2 * 12/2015 Itou .................... H04N 13/106
(Continued)

FOREIGN PATENT DOCUMENTS

JP 6-62252 A 3/1994
JP 2004-118448 A 4/2004
(Continued)

OTHER PUBLICATIONS

International Search Report mailed on Sep. 24, 2020 in PCT/JP2020/028727 filed on Jul. 27, 2020 (3 pages).

*Primary Examiner* — Bobbak Safaipour
(74) *Attorney, Agent, or Firm* — Oblon, McClelland, Maier & Neustadt, L.L.P.

(57) ABSTRACT

An object is to facilitate tone adjustment. For this object, an image processing system according to the present technology includes: a setting value determination unit that determines a setting value of a tone curve characteristic to be applied to a linear image signal having a linear characteristic according to an operation of a user; a tone adjustment unit that applies the tone curve characteristic based on the determined setting value to the linear image signal; and an image signal output unit that outputs, as an output image signal, an image signal after tone curve application obtained by application of the tone curve characteristic to the linear image signal. This configuration facilitates tone adjustment.

17 Claims, 13 Drawing Sheets

(56) References Cited

U.S. PATENT DOCUMENTS

| | | | | |
|---|---|---|---|---|
| 10,297,057 | B2* | 5/2019 | Hasegawa | G06T 5/40 |
| 10,963,998 | B1* | 3/2021 | Baar | G09G 5/10 |
| 11,635,767 | B2* | 4/2023 | Nisenzon | G05D 1/0274 |
| | | | | 701/28 |
| 12,138,045 | B2* | 11/2024 | Wheeler | A61B 5/123 |
| 2009/0256935 | A1* | 10/2009 | Endo | H04N 5/202 |
| | | | | 348/254 |
| 2013/0321666 | A1* | 12/2013 | Aokage | H04N 23/667 |
| | | | | 348/234 |
| 2018/0184061 | A1 | 6/2018 | Kitsunai et al. | |
| 2018/0288316 | A1* | 10/2018 | Shionoya | H04N 23/843 |
| 2019/0057495 | A1* | 2/2019 | Shionoya | H04N 23/843 |
| 2020/0077067 | A1* | 3/2020 | Hata | H04N 9/77 |
| 2020/0327649 | A1* | 10/2020 | Kimura | H04N 23/80 |
| 2022/0311983 | A1* | 9/2022 | Kamiya | H04N 23/63 |

FOREIGN PATENT DOCUMENTS

| | | |
|---|---|---|
| JP | 2009-253865 A | 10/2009 |
| JP | 2012-253499 A | 12/2012 |
| JP | 2018-107727 A | 7/2018 |
| WO | WO 2019/167555 A1 | 9/2019 |

* cited by examiner

IMAGE PROCESSING SYSTEM, INFORMATION PROCESSING DEVICE, IMAGE CAPTURING DEVICE, AND IMAGE PROCESSING DEVICE

TECHNICAL FIELD

The present technology relates to an image processing system, an information processing device, an image capturing device, and an image processing device that output an output image signal obtained by performing signal processing on an input image signal.

BACKGROUND ART

There is a demand for displaying an image with a tone intended by an operator on a display device.

For example, Patent Document 1 below discloses a configuration in which a gamma curve is made adjustable to perform gamma correction that also serves as tone adjustment.

CITATION LIST

Patent Document

Patent Document 1: Japanese Patent Application Laid-Open No. 2009-253865

SUMMARY OF THE INVENTION

Problems to be Solved by the Invention

However, there is a problem that it is difficult to understand how an output image signal changes according to the adjustment of the gamma curve, and it is difficult to perform adjustment for obtaining the image with the tone intended by the operator.

Therefore, an object of the present technology is to facilitate tone adjustment.

Solutions to Problems

An image processing system according to the present technology includes: a setting value determination unit that determines a setting value of a tone curve characteristic to be applied to a linear image signal having a linear characteristic according to an operation of a user; a tone adjustment unit that applies the tone curve characteristic based on the determined setting value to the linear image signal; and an image signal output unit that outputs, as an output image signal, an image signal after tone curve application obtained by application of the tone curve characteristic to the linear image signal.

With this configuration, the output image signal reflecting the tone curve characteristic adjusted by the operation is output.

The above-described image processing system may further include a nonlinear processing unit that performs nonlinear processing on an image signal obtained by application of the tone curve characteristic to the linear image signal, and outputs the image signal obtained by performing the nonlinear processing as the image signal after tone curve application, and the image signal output unit may output the image signal after tone curve application as the output image signal.

The nonlinear processing such as gamma correction or OETF processing is performed after the tone curve characteristic is applied, so that it is possible to generate a digital signal conforming to a video standard.

In the above-described image processing system, the image signal having the linear characteristic may be a signal before nonlinear processing is performed.

The nonlinear processing is, for example, gamma correction, OETF processing, or the like.

In the above-described image processing system, the tone adjustment unit may include a plurality of tone control units.

Providing the plurality of tone control units makes it possible to selectively use the tone control units according to the purpose.

The above-described image processing system may include: a terminal device; and an image capturing device, the terminal device may include an operation detection unit that detects the operation, the setting value determination unit, and a transmission control unit that performs control to transmit the setting value, and the image capturing device may include an image capturing unit that captures an image, the tone adjustment unit, and the image signal output unit.

That is, the image processing system includes the terminal device that operates the tone curve characteristic and the image capturing device that executes tone control processing of applying the tone curve characteristic according to the operation to an input image signal from the image capturing unit.

The above-described image processing system may further include a monitor device that receives the output image signal from the image signal output unit and displays an image.

The tone curve characteristic can be operated while the image displayed on the monitor device is visually recognized.

The image signal output unit in the above-described image processing system may output a first output image signal and a second output image signal.

That is, the tone curve characteristic is applied to two different output image signals.

In the above-described image processing system, the first output image signal may be an image signal based on a first resolution, and the second output image signal may be an image signal based on a second resolution lower than the first resolution.

The tone curve characteristic is applied to two output image signals having different resolutions.

The tone adjustment unit in the above-described image processing system may perform tone adjustment on the first output image signal and the second output image signal by application of the tone curve characteristic.

With this configuration, the tone curve characteristic is applied to two different output image signals by one operation.

The above-described image processing system may further include an operation detection unit that detects an operation for setting the setting value, the operation designating a plurality of coordinates for performing curve interpolation.

With this configuration, the tone adjustment unit applies the tone curve characteristic obtained by application of linear interpolation to the plurality of designated coordinates.

The above-described image processing system may further include an operation detection unit that detects an operation for setting the setting value, the operation designating a slope and an intercept of a logarithmic graph.

With this configuration, the tone adjustment unit applies the tone curve characteristic specified by the slope and intercept of the logarithmic graph.

The above-described image processing system may further include an operation detection unit that detects an operation for setting the setting value, the operation designating an adjustment point, an adjustment range, and an adjustment width of a signal level of an input image signal for specifying a curve shape in a graph of the tone curve characteristic expressed on a linear graph space.

With this configuration, the tone adjustment unit applies the tone curve characteristic having the curve shape specified by the adjustment point, the adjustment range, and the adjustment width of the input signal level.

The above-described image processing system may further include a display unit that displays the tone curve characteristic.

With this configuration, an operator who performs tone adjustment can visually recognize the tone curve characteristic.

The display unit in the above-described image processing system may display a composite tone curve characteristic obtained by composition of a plurality of the tone curve characteristics.

With this configuration, in a case where adjustment work is performed on the plurality of tone curve characteristics, it is possible to grasp the application result in a case where all the plurality of tone curve characteristics are applied.

The display unit in the above-described image processing system may be switchable between a linear display mode in which the tone curve characteristic is displayed by use of a linear axis and a logarithmic display mode in which the tone curve characteristic is displayed by use of a logarithmic axis.

With this configuration, the display mode can be switched as necessary in a case where the adjustment work is performed on the tone curve characteristic.

The above-described image processing system may further include a display unit that is capable of displaying the tone curve characteristic and has a marker function of designating an adjustment target range in the tone curve characteristic, and the monitor device may be capable of performing specific display of a pixel range corresponding to the adjustment target range.

That is, designating the adjustment range in the tone curve characteristic displayed on the display unit makes it possible to visually recognize the pixel range corresponding to the adjustment range in an output image.

The tone adjustment unit in the above-described image processing system may be configured not to change the tone curve characteristic to be applied to an input image signal in a case where a tally signal is being received.

With this configuration, in the image capturing device receiving the tally signal, that is, for example, the image capturing device being used for broadcasting, the change in the tone curve characteristic is invalidated.

An information processing device according to the present technology includes: a setting value determination unit that determines a setting value of a tone curve characteristic to be applied to a linear image signal having a linear characteristic according to an operation of a user; and a transmission control unit that performs control to transmit the setting value.

An image capturing device according to the present technology includes: an image capturing unit; a tone adjustment unit that applies a tone curve characteristic specified on the basis of a setting value transmitted from an external information processing device to a linear image signal obtained by the image capturing unit capturing an image, the linear image signal having a linear characteristic; and an image signal output unit that outputs, as an output image signal, an image signal after tone curve application obtained by application of the tone curve characteristic to the linear image signal.

An image processing device according to the present technology includes: a tone adjustment unit that applies a tone curve characteristic specified on the basis of a setting value transmitted from an external information processing device to a linear image signal having a linear characteristic; and an image signal output unit that outputs, as an output image signal, an image signal after tone curve application obtained by application of the tone curve characteristic to the linear image signal.

MODE FOR CARRYING OUT THE INVENTION

Figure 1:
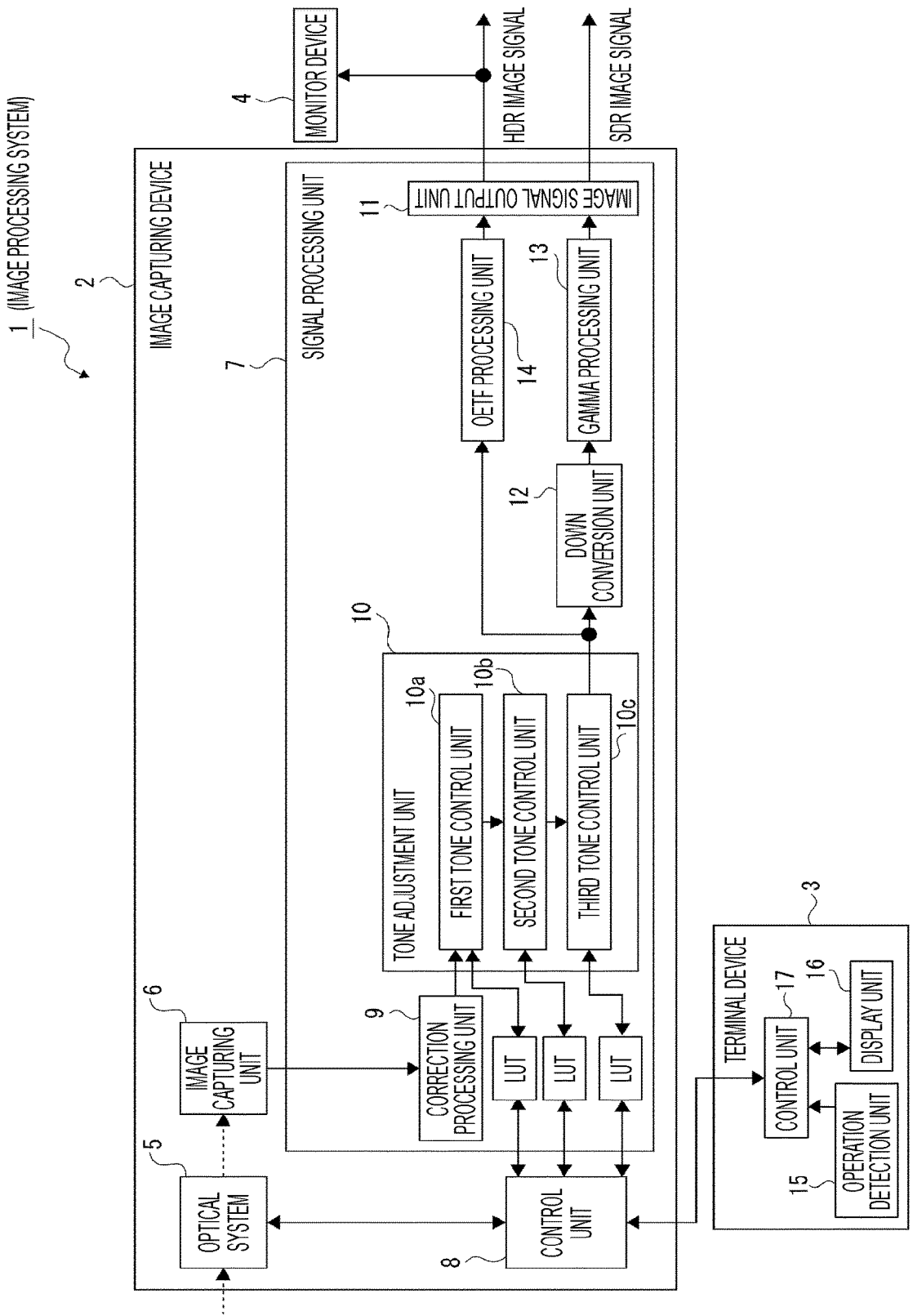
FIG. 1 is a block diagram of an image processing system according to an embodiment of the present technology.

Hereinafter, embodiments will be described in the following order with reference to the accompanying drawings.
<1. Configuration of image processing system>
<2. Operation of changing tone curve characteristic>

<3. Various types of processing>
<3-1. Processing in terminal device>
<3-2. Processing in image capturing device>
<4. Display of tone curve characteristic>
<4-1. Change of display mode of tone curve characteristic>
<4-2. Display using logarithmic axes>
<4-3. Display of target region>
<5. Second Embodiment>
<6. Summary>
<7. Present technology>

1. Configuration of Image Processing System

A configuration of an image processing system 1 according to an embodiment will be described with reference to FIG. 1.

The image processing system 1 includes an image capturing device 2, a terminal device 3, and a monitor device 4.

The image capturing device 2 is a device that performs various types of signal processing on a captured image signal obtained by capturing an image of a subject and outputs an image signal. The image capturing device 2 is, for example, a camera or the like used by a videographer for capturing an image.

The terminal device 3 is a terminal device that is configured to be able to communicate with the image capturing device 2 and gives an instruction on signal processing to be performed on the captured image signal. The terminal device 3 is, for example, an information processing device used by a video engineer or the like.

The monitor device 4 is a device to which the image signal output from the image capturing device 2 is input and that displays an image corresponding to the input. The monitor device 4 is, for example, a display device used to check how an operation performed by the video engineer is reflected in the image.

The image capturing device 2 includes an optical system 5, an image capturing unit 6, a signal processing unit 7, and a control unit 8.

The optical system 5 includes, for example, various lenses such as an incident end lens, a zoom lens, a focus lens, and a condenser lens, a diaphragm mechanism that performs exposure control by adjusting an aperture amount or the like of a lens or an iris (diaphragm) such that sensing is performed in a state where signal charges are not saturated and are within a dynamic range, and the like.

The image capturing unit 6 includes, for example, a charge coupled device (CCD) type or complementary metal-oxide semiconductor (CMOS) type imaging element, and controls exposure of light from a subject, which is incident through the optical system 5. A sensor surface of the imaging element includes a sensing element in which a plurality of pixels is two-dimensionally arranged.

Furthermore, the image capturing unit 6 executes, for example, correlated double sampling (CDS) processing, automatic gain control (AGC) processing, or the like, on an electrical signal obtained by photoelectrically converting light received by the imaging element, and further performs analog/digital (A/D) conversion processing. The captured image signal as a digital signal is then output to the signal processing unit 7 in the subsequent stage.

The signal processing unit 7 includes, for example, a microprocessor specialized for digital signal processing, such as a digital signal processor (DSP), a microcomputer, and the like.

The signal processing unit 7 includes units for performing various types of signal processing on the digital signal (captured image signal) transmitted from the image capturing unit 6.

In the present embodiment, the signal processing unit 7 outputs a plurality of image signals having different resolutions. The plurality of image signals includes, for example, a standard dynamic range (SDR) image signal with a high definition (HD) and a hi dynamic range (HDR) image signal with a 4K resolution.

Examples of transmission of the plurality of image signals include simultaneous broadcasting that requires an image signal with a 4K resolution for terrestrial broadcasting or satellite broadcasting and an image signal with an HD resolution for Internet broadcasting.

The control unit 8 performs overall control of the image capturing device 2. For example, the control unit 8 implements an image capturing operation according to an operation of a camera operator, and switches various image capturing modes.

Furthermore, the control unit 8 instructs an optical system driver (not illustrated) to control various lenses included in the optical system 5. Various lens groups and the diaphragm mechanism included in the optical system 5 are controlled by the control unit 8 via the optical system driver.

The control unit 8 specifies a tone curve characteristic by performing curve interpolation such as spline interpolation on the basis of coordinates or the like designated by an operator, and generates a look-up table (LUT). In a case where the LUT has already been generated, the LUT may be updated. The LUT is, for example, a table in which the minimum value to the maximum value of an input signal level are divided into 256, and the correspondence relationship between input signal levels and output signal levels is stored. That is, the LUT in the present embodiment is a table for converting an input signal level into an output signal level.

Note that curve interpolation does not have to be performed, for example, in a case where the tone curve characteristic can be specified by information regarding a slope or an intercept. In this case, the tone curve characteristic is specified on the basis of the information regarding the slope or the intercept, and the LUT is updated.

Here, the spline interpolation will be described.

In cubic spline interpolation, the following Formula (1) is used.

[Math. 1]

$$S_j(x)=a_j(x-x_j)^3+b_j(x-x_j)^2+c_j(x-x_j)+d_j \ (j=0,1,2,3,\ldots,N-1) \quad \text{Formula (1)}$$

Coordinates can be interpolated by the polynomial expressed as the above Formula (1). In the case of having three or more coordinates, the entire shape of the tone curve characteristic can be specified by use of the above Formula (1) multiple times.

The signal processing unit 7 includes a correction processing unit 9, a tone adjustment unit 10, a down conversion unit 12, a gamma processing unit 13, an opto-electronic transfer function (OETF) processing unit 14, and an image signal output unit 11 as units for performing various types of signal processing.

The correction processing unit 9 performs processing such as flaw correction, correction processing among R, G, and B color channels, white balance correction, or aberration correction, for example. The digital signal corrected by the correction processing unit 9 is input to the tone adjustment unit 10 as an image signal.

Note that the correction processing unit 9 in the present embodiment does not perform nonlinear processing on a luminance value (nonlinear processing in the luminance direction). Therefore, the signal output from the correction processing unit 9 and input to the tone adjustment unit 10 is a signal maintaining a linear characteristic. In other words, the signal having the linear characteristic is a signal before the nonlinear processing is performed in a case where the signal output from the imaging element is regarded as a signal maintaining the linearity of the luminance value.

Note that the nonlinear processing on the luminance value is, for example, gamma correction, OETF processing, or the like to be described later.

The tone adjustment unit 10 performs processing for adjusting the tone (appearance) of the image on the image signal input from the correction processing unit 9, that is, performs application of a tone curve characteristic. The application of a tone curve characteristic means applying tone adjustment based on the curve shape of the tone curve characteristic to the input image signal, and means performing tone adjustment of the image.

The tone adjustment unit 10 may include a plurality of processing units. In the present embodiment, as illustrated in FIG. 1, the tone adjustment unit 10 includes a first tone control unit 10a that performs a first tone adjustment, a second tone control unit 10b that performs a second tone adjustment, and a third tone control unit 10c that performs a third tone adjustment. Each tone control unit performs tone adjustment by acquiring, from the LUT, a signal level of an output image signal according to a signal level of an input image signal.

The first tone control unit 10a, the second tone control unit 10b, and the third tone control unit 10c may perform tone adjustment according to different purposes.

For example, shooting a drama or the like including a plurality of stories (a plurality of episodes) will be considered. The first tone control unit 10a performs tone adjustment for the purpose of providing a sense of unity to the stories constituting the drama. Specifically, the first tone control unit 10a performs rough tone adjustment such that each story (each episode) includes video having the same tone. As the rough tone adjustment, for example, it is conceivable to put no restriction on the adjustment amount. This tone adjustment makes it possible to greatly change the tone.

The second tone control unit 10b performs tone adjustment such that one story (episode) has a tone different from those of other stories (episodes) while the sense of unity is maintained. Specifically, the second tone control unit 10b performs slightly fine tone adjustment to give a tone specific to the story (episode) while the tone of the entire drama determined by the first tone control unit 10a is maintained. As the slightly fine tone adjustment, for example, it is conceivable to put a restriction on the adjustment amount. This tone adjustment makes it impossible to greatly change the tone.

The third tone control unit 10c performs fine tone adjustment based on an illumination environment (including natural light) different for each scene being shot. Specifically, the third tone control unit 10c performs fine tone adjustment required for each scene, that is, minor tone adjustment while the rough tones determined by the first tone control unit 10a and the second tone control unit 10b are maintained. As the minor tone adjustment, for example, it is conceivable to put a large restriction on the adjustment amount. This tone adjustment makes it possible to perform minor adjustment without changing the directionality of the tone adjustment by the first tone control unit 10a and the second tone control unit 10b.

For example, the tone adjustment level of the first tone control unit 10a is determined by a director who performs overall management of the drama and gives instructions. The setting of the first tone control unit 10a is determined, for example, at the start of shooting of the drama, and is not adjusted subsequently.

Furthermore, the director determines the tone adjustment setting of the second tone control unit 10b in order to perform tone adjustment so as to apply a different tone for each story. The setting of the second tone control unit 10b is determined, for example, at the start of shooting of each story, and is not readjusted until the shooting of the story is completed.

Furthermore, a camera operator or video engineer who shoots each scene determines the tone adjustment setting of the third tone control unit 10c in order to capture an image with a tone suitable for the scene being shot. The setting of the third tone control unit 10c is reset for each scene, for example.

Note that the usage mode of each tone control unit is merely an example, and such an operation is not necessarily required.

Note that, in a case where tone adjustment using only a part of the plurality of tone control units is performed, a tone control unit that is not used may set the input luminance value and the output luminance value to the same value, so that substantially no adjustment may be performed. Alternatively, the image signal may be output to each unit in the subsequent stage without passing through the tone control unit that is not used. Specifically, in a case where tone adjustment using only the first tone control unit 10a is performed, an output signal from the correction processing unit 9 may be input to the first tone control unit 10a, and then an output signal from the first tone control unit 10a may be directly input to the down conversion unit 12 and the OETF processing unit 14. Needless to say, in a case where tone adjustment using only the third tone control unit 10c is performed, the output signal from the correction processing unit 9 may be directly input to the third tone control unit 10c.

Furthermore, in a case where live broadcasting or the like is performed, the first tone control unit 10a may perform rough tone adjustment during checking of image data output before the broadcasting, that is, during preparation for the live broadcasting, and the second tone control unit 10b and the third tone control unit 10c may perform fine tone adjustment during the broadcasting.

In this case, the second tone control unit 10b and the third tone control unit 10c may restrict the adjustment amount of tone adjustment to prevent a large change in the tone from being erroneously made. Furthermore, during the broadcasting, a tone curve characteristic of the first tone control unit 10a, which is set before the broadcasting, is continuously adopted, so that the entire tone is prevented from changing too much.

Note that, in a case where there is a plurality of image capturing devices 2 used for broadcasting, an adjustment operation on one of first tone control units 10a is detected by the terminal device 3 to be described later, and a tone curve characteristic specified according to the detected adjustment operation can be applied to the first tone control units 10a of all the image capturing devices 2 at once, whereby all the image capturing devices 2 used for the broadcasting can be quickly adjusted.

Furthermore, in the tone adjustment performed by use of the second tone control unit 10b and the third tone control unit 10c during the broadcasting, tone curve characteristics are applicable to only one target device of the image capturing devices 2, so that it is possible to prevent fine adjustment for the one image capturing device 2 from being erroneously applied to another one of the image capturing devices 2.

The down conversion unit 12 performs resolution conversion processing on the image signal output from the tone adjustment unit 10. In the present example, the down conversion unit 12 performs processing of converting an image signal with a 4K resolution captured by the image capturing unit 6 into an image signal with an HD resolution.

The gamma processing unit 13 applies gamma correction to the down-converted image signal with the HD resolution to generate an SDR image signal with an HD resolution.

The image signal output from the tone adjustment unit 10 is input not only to the down conversion unit 12 but also to the OETF processing unit 14.

The OETF processing unit 14 performs OETF processing on the image signal output from the tone adjustment unit 10 to generate an HDR image signal with a 4K resolution. In the OETF processing, processing of generating a digital signal conforming to a video standard of an output destination is performed.

The image signal output unit 11 outputs the image signals generated by the gamma processing unit 13 and the OETF processing unit 14. The image signal output unit 11 may be, for example, an output terminal or a communication unit that performs wireless or wired communication control. With this configuration, the output signal from the tone adjustment unit 10 is converted into the image signals having different resolutions (the SDR image signal with the HD resolution and the HDR image signal with the 4K resolution), and the image signals are output from the image signal output unit 11.

Note that each of the signals output from the image signal output unit 11 is referred to as an output image signal. The image signal output unit 11 outputs an image signal after tone curve application, to which the tone curve characteristic is applied, as the output image signal. Note that even a signal obtained by the gamma processing unit 13 or the OETF processing unit 14 performing nonlinear processing is also a signal to which a tone curve characteristic is applied, and thus can be said to be an image signal after tone curve characteristic application.

The terminal device 3 is an information processing device that makes various requests for tone adjustment to the tone adjustment unit 10 of the image capturing device 2. The terminal device 3 is, for example, a personal computer (PC), a tablet PC, a smartphone, or the like.

The terminal device 3 is an information processing device that performs an operation for adjusting the tone curve characteristic used when the tone adjustment unit 10 of the image capturing device 2 performs tone adjustment on the input image signal.

The terminal device 3 includes an operation detection unit 15, a display unit 16, and a control unit 17.

The operation detection unit 15 detects an operation for adjusting the tone curve characteristic applied to the input image signal by the tone adjustment unit 10. Furthermore, the operation detection unit 15 may be referred to as an operation unit for adjusting the tone curve characteristic.

For example, examples of the operation detection unit 15 include a mouse or a pen tablet included in a PC, a touch panel included in a tablet PC or a smartphone, and the like.

Operation information detected by the operation detection unit 15 and a change in the tone curve characteristic will be described later.

The display unit 16 displays the tone curve characteristic to be changed. The tone curve characteristic displayed on the display unit 16 changes according to the operation information detected by the operation detection unit 15. Therefore, an operator can perform an operation of changing the tone curve characteristic while visually recognizing the change in the tone curve characteristic displayed on the display unit 16.

The control unit 17 receives the operation information from the operation detection unit 15.

In addition, the control unit 17 performs display control of the display unit 16 in order to display the tone curve characteristic.

Furthermore, the control unit 17 acquires setting values that are input by the operator such as a video engineer and specifies the tone curve characteristic intended by the operator, and transmits the setting values to the control unit 8 of the image capturing device 2. The specification of the tone curve characteristic means that the curve shape of the tone curve characteristic is uniquely determined.

Note that the control unit 17 functions as a setting value determination unit that determines the setting values input by the operator.

The monitor device 4 is a device that performs image display based on the HDR image signal with the 4K resolution generated by the OETF processing unit 14 performing OETF processing on the image signal to which the tone curve characteristics are applied by the tone control units included in the tone adjustment unit 10. That is, the operator can perform tone adjustment while visually recognizing the tone curve characteristic displayed on the display unit 16 of the terminal device 3 and checking an image displayed on the monitor device 4. As a result, it is possible to improve work efficiency and reduce work errors.

2. Operation of Changing Tone Curve Characteristic

The operation of changing a tone curve characteristic used in each tone control unit of the tone adjustment unit 10 will be described with reference to each of FIGS. 2 to 4. Specifically, an operator changes the tone curve characteristic using the terminal device 3.

Figure 2:
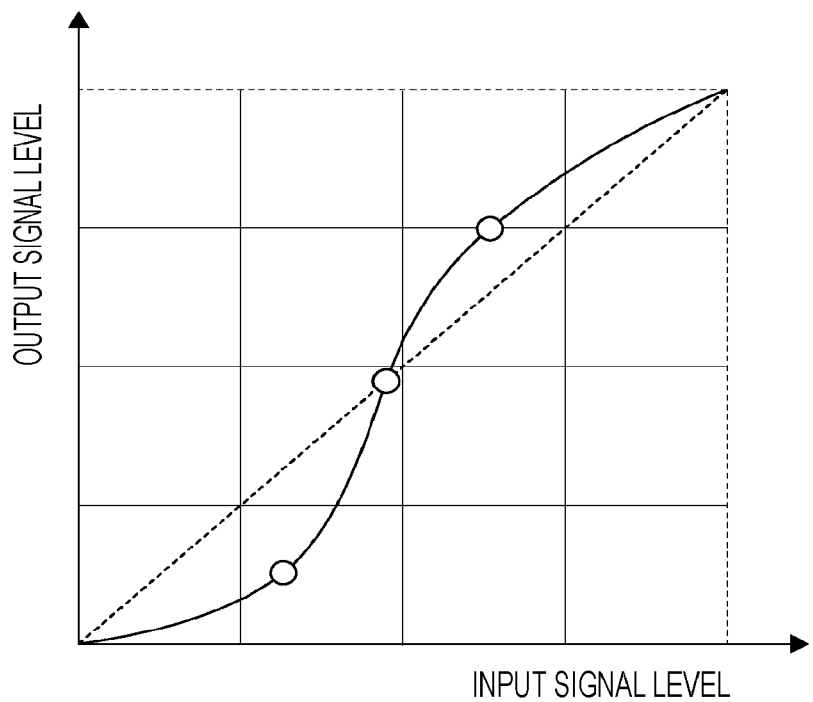
FIG. 2 is a diagram illustrating an example of a tone curve characteristic.

FIG. 2 illustrates an example of the tone curve characteristic. For example, an example of a tone curve characteristic applied to an input image signal by the first tone control unit 10a is illustrated.

Note that, in each drawing, the horizontal axis represents the input signal level and the vertical axis represents the output signal level. Furthermore, a graph indicated by a straight broken line in each drawing illustrates the relationship between the input signal level and the output signal level in a case where no tone curve characteristic is applied. That is, no tone curve characteristic is applied to the input signal level input to the tone control unit, and the input signal is output as an output signal from the tone control unit as it is. The output signal is input to the next tone control unit, or input to the down conversion unit 12 and the OETF processing unit 14.

The description returns to FIG. 2.

In the graph illustrated in FIG. 2, both axes are linear axes. The present example illustrates a case where the operator performs an operation of designating three points indicated by circles in the drawing.

When the operator designates three points, the control unit 17 acquires, as setting values, a total of five points obtained by adding two points at both ends of the graph to the designated three points.

In the graph of the tone curve characteristic illustrated in FIG. 2, curve interpolation is performed to obtain a smooth curve passing through two points at both ends and three points designated by the operator.

The control unit 17 performs display control to display the tone curve characteristic generated by the curve interpolation on the display unit 16. Furthermore, the control unit 17 transmits the setting values designated by the operator to the control unit 8 of the image capturing device 2. At this time, the control unit 17 may transmit information regarding the coordinates of the three points designated by the operator, or may transmit information regarding the coordinates of the five points including two points at both ends. Alternatively, the control unit 17 may transmit information regarding all coordinates included in the LUT (for example, information regarding coordinates of 500 points) to the control unit 8. Furthermore, the control unit 17 may transmit difference information between coordinates before and after the tone adjustment, or may transmit only a changed part of the LUT. Moreover, the control unit 17 may transmit only information regarding changed coordinates among changeable coordinates.

Figure 3:
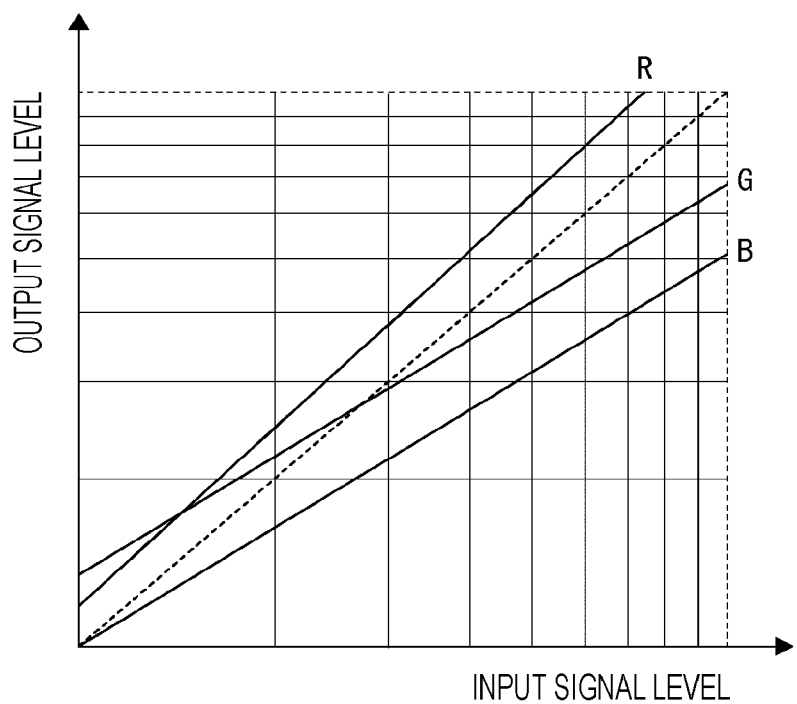
FIG. 3 is a diagram illustrating other examples of the tone curve characteristic.

FIG. 3 illustrates other examples of the tone curve characteristic. The tone curve characteristics illustrated in FIG. 3 are, for example, examples of tone curve characteristics applied to the input image signal by the second tone control unit 10*b*.

In the graph illustrated in FIG. 3, both axes are logarithmic axes. In the example illustrated in FIG. 3, adjustment can be performed for each of the three primary colors of light in the input image signal. That is, the tone curve characteristic for each of red (R), green (G), and blue (B) is displayed. Furthermore, in the tone curve characteristics illustrated in FIG. 3, for example, only a slope and an intercept of the graph are permitted to be changed. The operator can perform an operation of designating the slope and the intercept of the graph.

According to the display mode of the tone curve characteristics as illustrated in FIG. 3, tone adjustment can be performed for each of the three primary colors. Note that the tone curve characteristic of each of the three primary colors may be displayed with both axes set as linear axes.

The control unit 17 acquires setting values for specifying the tone curve characteristics illustrated in FIG. 3. These setting values are input as the slope and intercept of the graph for each of R, G, and B by the operator.

Figure 4:
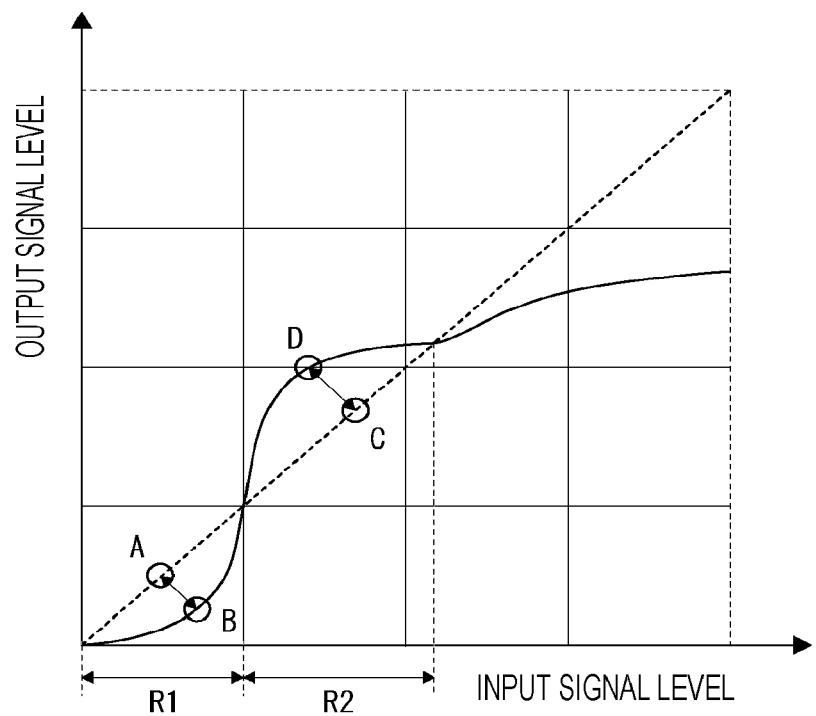
FIG. 4 is a diagram illustrating still another example of the tone curve characteristic.

FIG. 4 illustrates still another example of the tone curve characteristic. The tone curve characteristic illustrated in FIG. 4 is, for example, an example of a tone curve characteristic applied to the input image signal by the third tone control unit 10*c*.

In the graph illustrated in FIG. 4, both axes are linear axes. The present example is an example in which the operator performs an operation of moving a point A indicated by a circle in the drawing to a point B and then performs an operation of moving a point C to a point D.

By such an operation, the tone curve characteristic is transformed into the state illustrated in FIG. 4.

Note that the display mode of the tone curve characteristic illustrated in each of FIGS. 2 to 4 may be used for any of the tone control units included in the tone adjustment unit 10.

The control unit 17 acquires setting values designated by an operation of the operator. For example, the control unit 17 extracts the coordinate of the point A on the horizontal axis as an "adjustment point" for tone adjustment, extracts width information for specifying a range R1 indicated in the drawing as an "adjustment width" for tone adjustment, and extracts the difference between the point A and the point B as an "adjustment amount" for tone adjustment, which are setting values for specifying the curve shape of the tone curve characteristic in the range R1. As a result, the curve shape in the range R1 can be specified. Similarly, an adjustment point, an adjustment width, and an adjustment amount are acquired as setting values for specifying the curve shape in a range R2. That is, in the example illustrated in FIG. 4, two adjustment points, two adjustment widths, and two adjustment amounts are acquired as setting values according to the operation of the operator.

Note that the operation amount allowed to the operator may be changed to selectively use the rough tone adjustment and the fine tone adjustment described above. Specifically, for example, the operator is allowed to designate one or a plurality of arbitrary points on the graph illustrated in FIG. 2, in which both axes are linear axes, whereby a user interface is provided that can freely set the curve shape of the tone curve characteristic, which implements rough tone adjustment.

Furthermore, for example, in the graph illustrated in FIG. 3, in which both axes are logarithmic graphs, only the slope and the intercept can be designated, whereby a user interface is provided in which a restriction is put on the change in the curve shape of the tone curve characteristic, which implements slightly fine tone adjustment.

Moreover, for example, in the graph illustrated in FIG. 3, in which both axes are logarithmic graphs, only the slope and the intercept can be designated, and numerical values that can be input as the slope and the intercept are restricted, whereby a user interface is provided in which a further restriction is put on the change in the curve shape of the tone curve characteristic, which implements minor tone adjustment.

Note that these are merely examples, and for example, an operation of performing rough tone adjustment, an operation of performing slightly fine tone adjustment, and an operation of performing minor tone adjustment may be possible on the graph illustrated in FIG. 2, in which both axes are linear axes. In this case, for example, a restriction may be put on a region that can be designated on the graph or a difference may be provided in the number of points that can be designated, so that the range of each tone adjustment may be determined.

3. Various Types of Processing

3-1. Processing in Terminal Device

Figure 5:
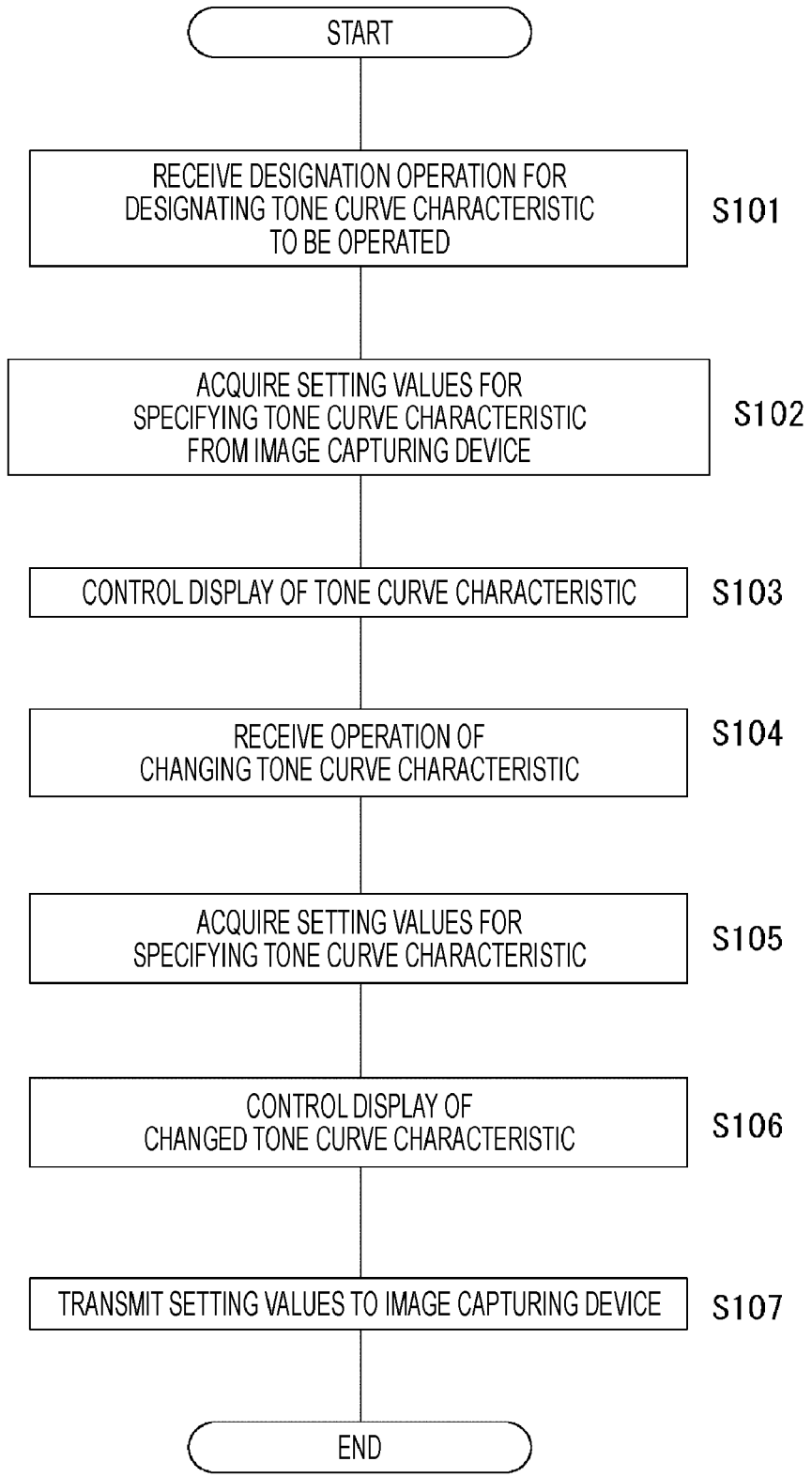
FIG. 5 is a flowchart of an example of processing performed by a terminal device in tone adjustment work.

Processing executed by the control unit 17 of the terminal device 3 when an operator performs tone adjustment work will be described with reference to FIG. 5.

In step S101, the control unit 17 detects a designation operation for designating a tone control unit to be operated. For example, the operator such as a video engineer performs an operation of selecting one of the first tone control unit 10*a*, the second tone control unit 10*b*, and the third tone control unit 10*c*.

The operation detection unit 15 detects such an operation and transmits operation information to the control unit 17. The control unit 17 determines whether or not the operation performed by the operator is an operation of selecting a tone control unit on the basis of the received operation information, and selects the designated tone control unit.

In step S102, the control unit 17 acquires, from the control unit 8 of the image capturing device 2, setting values for specifying the tone curve characteristic currently set in the tone control unit designated by the operator. The setting values may be acquired from the LUT or may be calculated on the basis of information stored in the LUT. Alternatively, the setting values themselves for specifying the curve shape may be stored in a storage unit of the image capturing device 2.

Note that the setting values may be acquired from information stored inside the terminal device 3 instead of being acquired from the control unit 8 of the image capturing device 2. Alternatively, the setting values for displaying the tone curve characteristic set last by the operator do not have to be acquired. In this case, no matter what the tone curve characteristic set by the previous operation is, a default tone curve characteristic is displayed in display control of step S103 to be described later.

Furthermore, the processing of step S102 may be executed before the operation of designating the tone control unit in step S101 is performed. In this case, since it is unclear which tone control unit the operator intends to adjust, the control unit 17 acquires setting values for all of the first tone control unit 10a, the second tone control unit 10b, and the third tone control unit 10c from the control unit 8 of the image capturing device 2. As a result, even if any tone control unit is selected, the display control of step S103 to be described later can be performed.

In step S103, the control unit 17 controls display of the tone curve characteristic. By this processing, the tone curve characteristic applied by the tone control unit selected by the operator is displayed on the display unit 16 of the terminal device 3.

In step S104, the control unit 17 detects the operator's operation of changing the tone curve characteristic.

The operation of changing the tone curve characteristic is, for example, an operation of designating a plurality of coordinates in the graph region as illustrated in FIG. 2. Alternatively, as illustrated in FIG. 3, the changing operation may be an operation of designating an intercept and a slope of the graph. Furthermore, as illustrated in FIG. 4, the changing operation may be an operation of moving a point on the graph.

The operation detection unit 15 detects such an operation and transmits operation information to the control unit 17.

The control unit 17 detects the operation of the operator as the changing operation on the basis of the operation information.

In step S105, the control unit 17 acquires setting values for specifying the tone curve characteristic on the basis of the operation information. Accordingly, the tone curve characteristic designated by the operator can be specified.

In step S106, the control unit 17 performs display control to display the changed tone curve characteristic on the display unit 16. By this processing, the tone curve characteristic after the changing operation is displayed on the display unit 16.

In step S107, the control unit 17 performs processing of transmitting the setting values to the image capturing device 2. As a result, the tone curve characteristic specified in step S105 can also be reproduced in the image capturing device 2.

Note that, in step S107, the control unit 17 may transmit information for specifying a tone control unit to be changed in addition to the setting values.

Note that the processing of displaying the changed tone curve characteristic in step S106 may be executed substantially simultaneously with the detection of the changing operation of step S104. With this configuration, the operator can check how the graph shape changes substantially in real time according to the changing operation, and the changing operation is facilitated.

Furthermore, various timings can be considered for applying the change in the tone curve characteristic to an output image from the image capturing device 2. For example, the transmission processing of step S107 may be executed by the operator performing an operation of pressing a determination button or the like, so that the change in the tone curve characteristic may be applied to the image signal output from the image capturing device 2. Alternatively, when the operator performs the operation of changing the tone curve characteristic, the tone curve characteristic displayed on a screen of the terminal device 3 may be changed in substantially real time, and the processing of transmitting the setting values to the image capturing device 2 may be executed in substantially real time, so that the change in the tone curve characteristic may be applied to the image signal output from the image capturing device 2. In this case, the tone of the image signal output from the image capturing device 2 is changed substantially in real time according to the changing operation of the operator.

Furthermore, as described in the implementation of the live broadcasting described above, there is a case where adjustment work for the first tone control unit 10a is for determining a rough tone of the output image before the broadcasting, and adjustment work for the second tone control unit 10b and the third tone control unit 10c is mainly for finely changing tone curves of the output image during the broadcasting. In this case, timings of applying the changes in the tone curves in the tone control units may be different.

Specifically, since the adjustment work for the first tone control unit 10a is performed before the broadcasting, the tone curve of the output image may be changed in substantially real time according to the tone adjustment work of the operator.

Furthermore, since the adjustment work for the second tone control unit 10b and the third tone control unit 10c is performed during the live broadcasting, the tone curves of the output image may be changed only in a case where the operator presses the determination button or the like.

Alternatively, in a case where the adjustment work for the second tone control unit 10b is mainly performed during the broadcasting and makes a relatively large change in the tone curve, and the adjustment work for the third tone control unit 10c is mainly performed during the broadcasting and makes a fine change in the tone curve, the change in the tone curve set in the second tone control unit 10b may be applied by the operator pressing the determination button, and the change in the tone curve set in the third tone control unit 10c may be applied in substantially real time even during the broadcasting.

3-2. Processing in Image Capturing Device

Processing executed by the control unit 8 of the image capturing device 2 when the operator performs the tone adjustment work will be described with reference to FIG. 6.

In step S201, the control unit 8 receives the setting values from the control unit 17 of the terminal device 3. This reception processing is performed according to the transmission processing of the control unit 17 of the terminal device 3. Note that, in step S201, the control unit 8 may further receive selection information for the tone control unit. However, since the control unit 8 grasps the tone control unit to be operated when the control unit 8 transmits the setting values to the control unit 17 of the terminal device 3 in correspondence with the processing in step S102 described above, the control unit 8 already has the selection information for the tone control unit at the time of executing the processing of step S201. That is, it is not necessary to receive again the selection information for the tone control unit in step S201.

In step S202, the control unit 8 selects the target tone control unit. The selection is performed on the basis of the received selection information for the tone control unit. Note that, in a case where the selection information is unnecessary, such as a case where only one tone control unit is provided, the processing of step S202 is unnecessary.

Next, in step S203, the control unit 8 specifies the tone curve characteristic on the basis of the received setting values. The specification of the tone curve characteristic means that the curve shape of the tone curve characteristic is uniquely determined. For example, the shape of the entire tone curve characteristic is calculated from the several received setting values, so that the tone curve characteristic is specified. In the specification of the tone curve characteristic, for example, linear interpolation such as spline interpolation is used.

Note that the tone curve characteristic is uniquely determined from the setting values by use of the same algorithm in both step S103 and step S203, and thus the tone curve characteristic used by the tone adjustment unit 10 and the tone curve characteristic displayed on the display unit 16 can be matched with each other.

In step S204, the control unit 8 generates (changes) an LUT based on the specified tone curve characteristic.

For example, the LUT is generated for each tone control unit. In the present example, provided are an LUT corresponding to the tone curve characteristic applied by the first tone control unit 10a, an LUT corresponding to the tone curve characteristic applied by the second tone control unit 10b, and an LUT corresponding to the tone curve characteristic applied by the third tone control unit 10c.

Furthermore, a plurality of LUTs may be provided in one tone control unit. For example, 1DLUTs each corresponding to one of R, G, and B of the image signal may be provided. That is, the first tone control unit 10a may be provided with an LUT for R, an LUT for G, and an LUT for B. In addition, in a case where output signal levels of R, G, and B are determined according to a combination of input signal levels of R, G, and B, one three-dimensional LUT (3DLUT) may be provided.

Regarding the change of the LUT, the entire LUT may be updated, or a part of the LUT may be updated. For example, in a case where only the range R1 illustrated in FIG. 4 is changed and the curve shapes of the other ranges are not changed, only the part corresponding to the range R1 may be changed. As a result, it is possible to reduce the processing load of the processing of updating the LUT.

Each tone control unit acquires an output signal level corresponding to an input signal level from the LUT to apply the tone curve characteristic.

In a case where the LUT does not store the value matching the input signal level, the input signal level may be converted into the output signal level associated with the input signal level closest to the desired input signal level, or the output signal level corresponding to the desired input signal level may be calculated by linear interpolation. Alternatively, curve interpolation such as spline interpolation may be used instead of linear interpolation.

In particular, in a case where it is desired to reduce the capacity of the LUT, the LUT may store discrete coordinate values. In this case, output signal levels corresponding to all input signal levels can be calculated by the above-described interpolation processing.

Note that the specification of the tone curve characteristic in step S203 and the generation of the LUT in step S204 may be executed by the tone adjustment unit 10.

3-2. Second Processing in Image Capturing Device

In the above example, an example in which the LUT is provided for each tone control unit has been described. In the present example, an example in which only one LUT is provided for the tone adjustment unit 10 will be described with reference to FIG. 7.

The control unit 8 receives the setting values from the terminal device 3, selects the tone control unit to be adjusted, and specifies the tone curve characteristic on the basis of the setting values by performing the series of processing from step S201 to step S203.

In step S205, the control unit 8 calculates a composite tone curve characteristic. In the calculation of the composite tone curve characteristic, the tone curve characteristic of the first tone control unit 10a, the tone curve characteristic of the second tone control unit 10b, and the tone curve characteristic of the third tone control unit 10c are used.

Specifically, the description will be made with reference to each of FIGS. 8 to 11.

Figure 8:
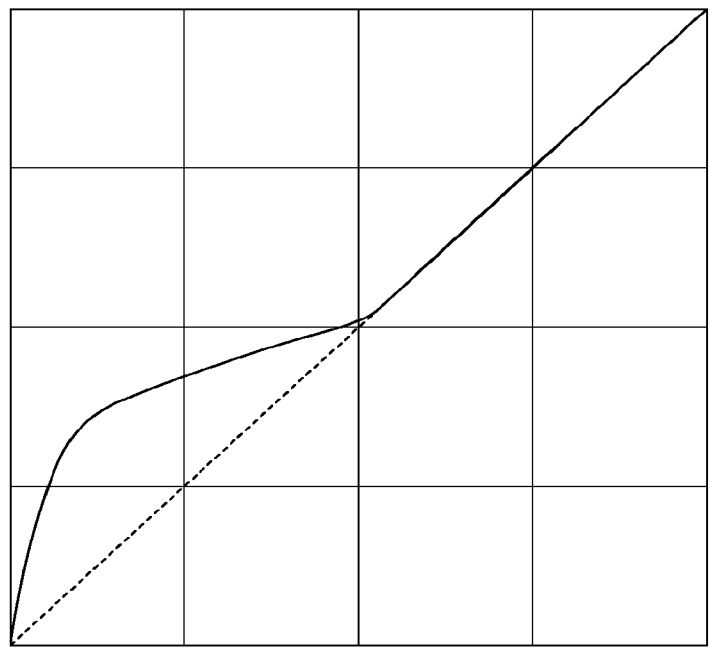
FIG. 8 is an example of a tone curve characteristic applied by a first tone control unit.
Figure 9:
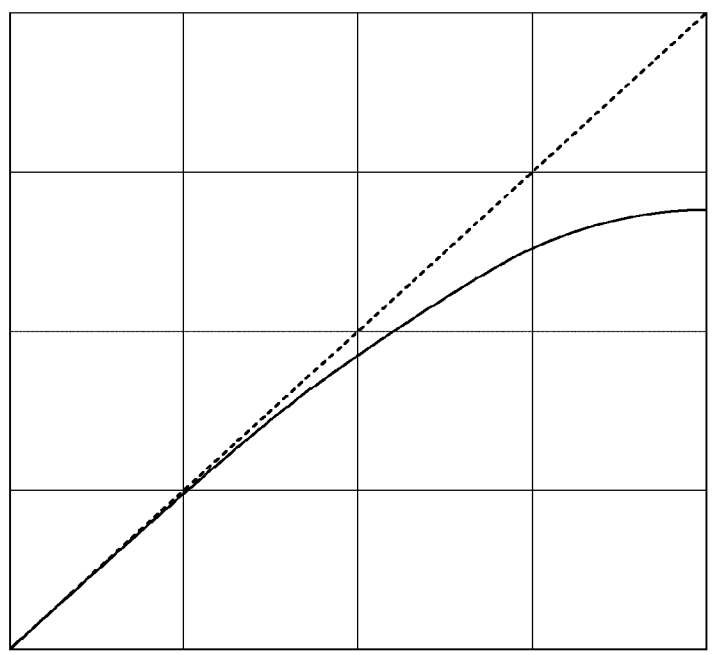
FIG. 9 is an example of a tone curve characteristic applied by a second tone control unit.
Figure 10:
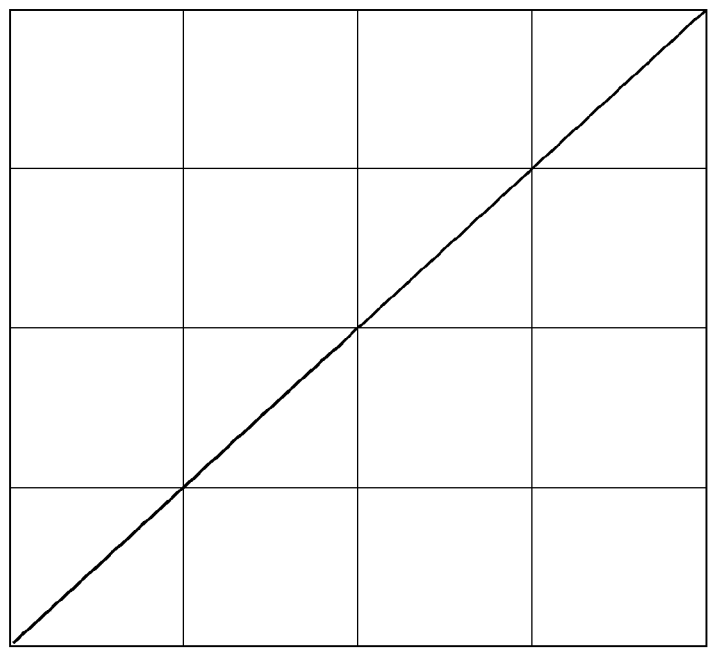
FIG. 10 is an example of a tone curve characteristic applied by a third tone control unit.

FIG. 8 is a graph of a tone curve characteristic T1 applied by the first tone control unit 10a. FIG. 9 is a graph of a tone curve characteristic T2 applied by the second tone control unit 10b. FIG. 10 is a graph of a tone curve characteristic T3 applied by the third tone control unit 10c.

Figure 11:
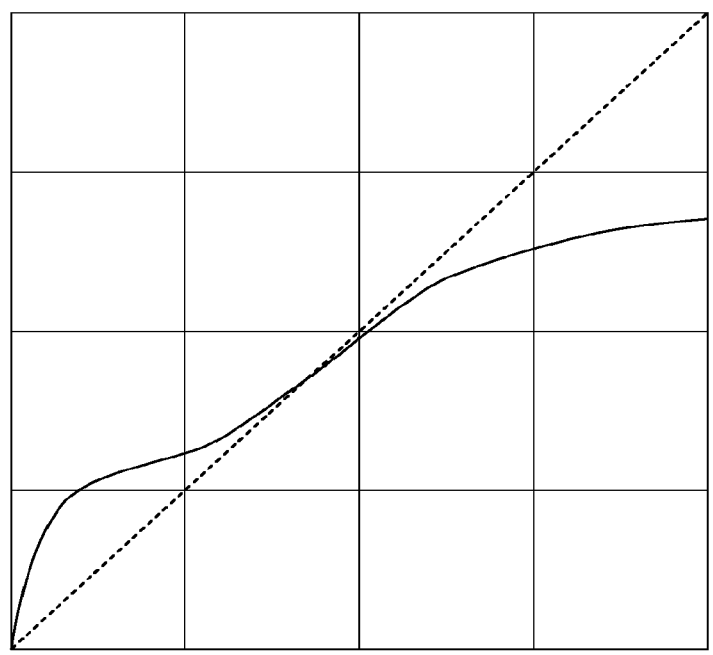
FIG. 11 is an example of a tone curve characteristic applied by a fourth tone control unit.

Furthermore, FIG. 11 illustrates a composite tone curve characteristic TC obtained by composition of the tone curve characteristic T1, the tone curve characteristic T2, and the tone curve characteristic T3.

The composite tone curve characteristic TC is a composite function calculated from the tone curve characteristic T1, the tone curve characteristic T2, and the tone curve characteristic T3.

An image signal obtained by sequential application of the tone curve characteristics T1, T2, and T3 to the input image signal input to the tone adjustment unit 10 is the same image signal as an image signal obtained by application of only the composite tone curve characteristic TC to the input image signal.

In step S206, the control unit 8 performs processing of updating the LUT.

The LUT updated in step S206 stores the correspondence relationship between the signal level of the input image signal input to the tone adjustment unit 10 and the signal level of the image signal output after all the tone curve characteristics applied by the tone control units are applied. That is, the correspondence relationship corresponding to the composite tone curve characteristic TC in FIG. 11 is stored.

As a result, it is not necessary to provide a plurality of LUTs, and thus it is possible to effectively use a storage area included in the image capturing device 2. In addition, it is possible to reduce a necessary storage area.

Note that the composite tone curve characteristic TC may be provided for each of R, G, and B. Even with such a configuration, it is possible to reduce the necessary storage area as compared with a case where LUTs corresponding to input signals of R, G, and B are held for each control unit.

Note that, in the present example, a configuration may be adopted in which the composite tone curve characteristic is displayable on the display unit 16 of the terminal device 3. For example, the display unit 16 may be configured to display both the tone curve characteristic of the tone control unit to be operated and the composite tone curve characteristic.

With this configuration, the adjustment work can be performed while the tone curve characteristic being adjusted is visually recognized, and it can be confirmed whether or not the final image is an intended image while the composite tone curve characteristic is checked. Therefore, it is possible to prevent the adjustment work from being redone and improve the work efficiency.

Figure 6:
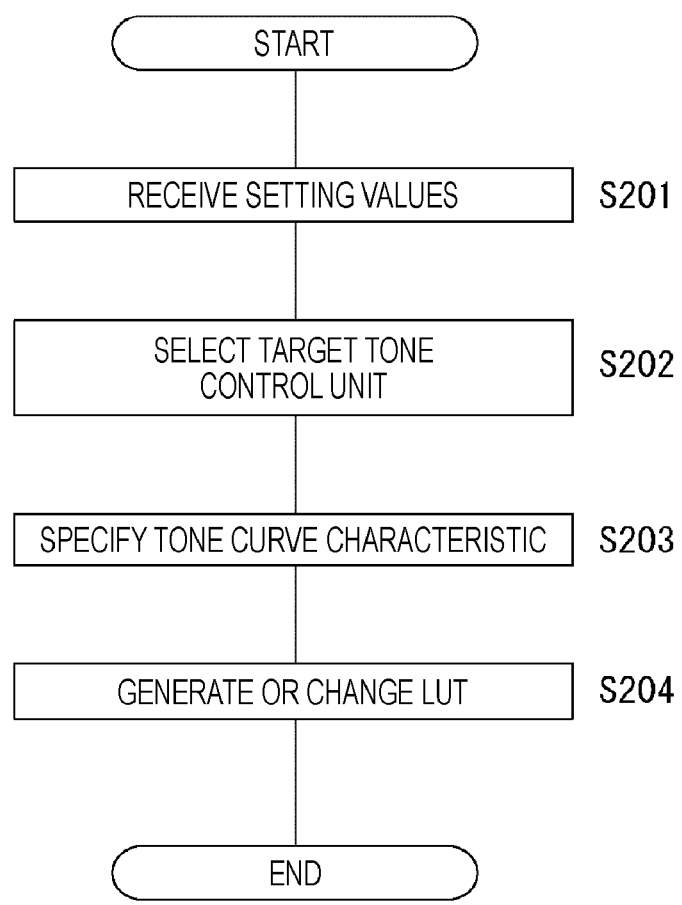
FIG. 6 is a flowchart of an example of processing performed by an image capturing device in the tone adjustment work.
Figure 7:
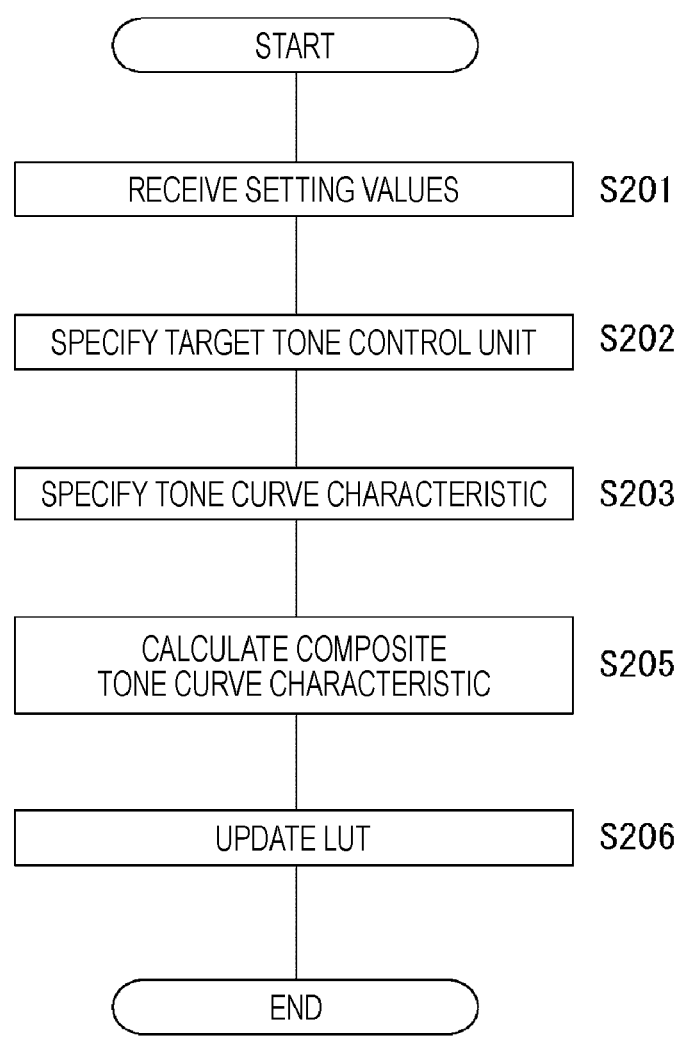
FIG. 7 is a flowchart of another example of the processing performed by the image capturing device in the tone adjustment work.

When the control unit 8 of the image capturing device 2 executes the processing illustrated in FIG. 6 or 7, the image capturing device 2 can similarly perform tone adjustment on a plurality of output image signals.

As a result, it is not necessary to perform tone adjustment for each of the plurality of image signals output from the image capturing device 2, and thus it is possible to shorten the tone adjustment work and reduce the processing load on the image capturing device 2.

Furthermore, the image capturing unit 6 includes the gamma processing unit 13 and the OETF processing unit 14 that each perform correction processing corresponding to one of the image signals output from the image capturing device 2. With this configuration, in a case where it is desired to adjust one image signal among the image signals output from the image capturing device 2, adjusting a corresponding processing unit (the gamma processing unit 13 or the OETF processing unit 14) makes it possible to implement the adjustment.

That is, since the tone adjustment unit 10 is provided separately from the gamma processing unit 13 and the OETF processing unit 14 and is provided in the preceding stage of the gamma processing unit 13 and the OETF processing unit 14, it is possible to cope with a case where it is desired to perform image adjustment on all image signals output from the image capturing device 2 and a case where it is desired to perform image adjustment on one image signal. That is, in a case where it is desired to perform tone adjustment on an image in both broadcasting with the 4K resolution and broadcasting with the HDR resolution, it is not necessary to individually adjust each image signal and it is possible to simplify an adjustment procedure and reduce the processing load because the tone adjustment unit 10 is provided in the preceding stage of the gamma processing unit 13 and the OETF processing unit 14.

4. Display of Tone Curve Characteristic

4-1. Change of Display Mode of Tone Curve Characteristic

The display unit 16 is configured to be able to display a tone curve characteristic in a plurality of modes.

Figure 12:
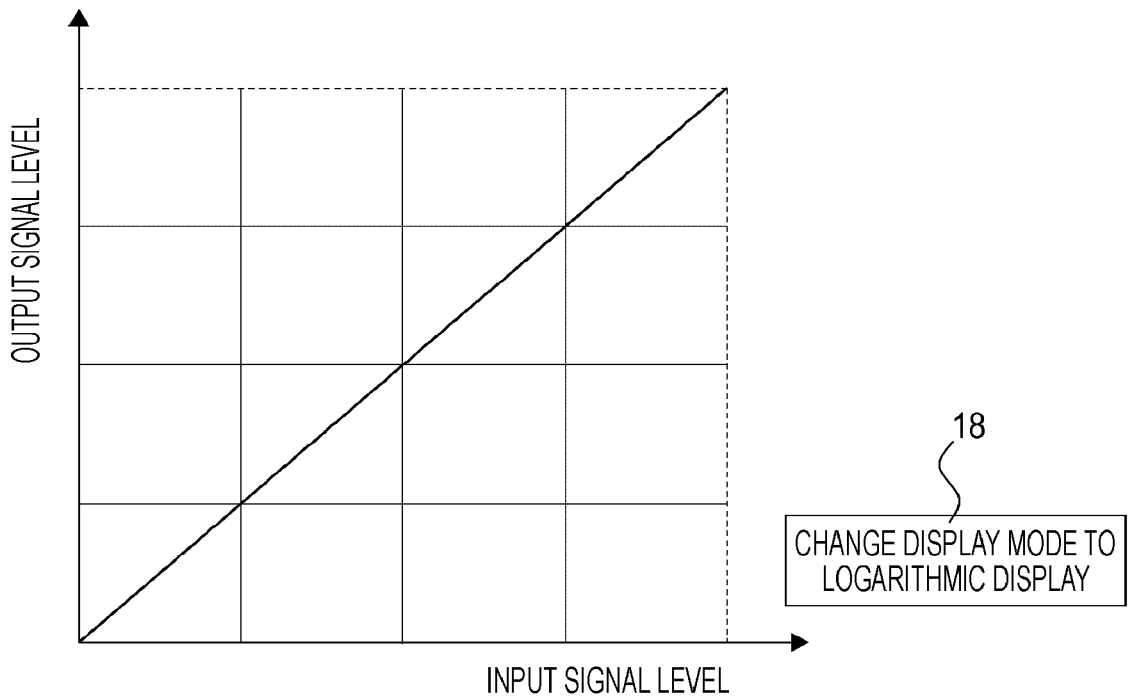
FIG. 12 is an explanatory diagram illustrating an example of a tone curve characteristic displayed by use of linear axes.
Figure 13:
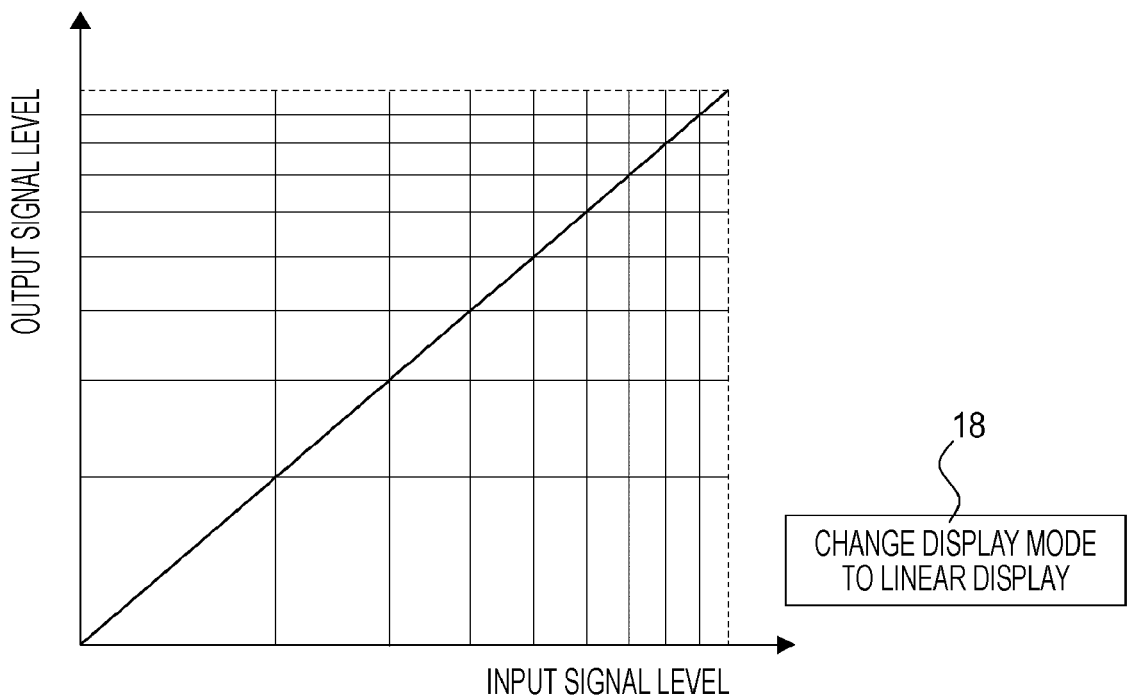
FIG. 13 is an explanatory diagram illustrating an example of the tone curve characteristic displayed by use of logarithmic axes.

This configuration will be specifically described with reference to FIGS. 12 and 13. FIGS. 12 and 13 illustrate examples of the tone curve characteristic displayed on the display unit 16.

In FIG. 12, the horizontal axis represents the input signal level and the vertical axis represents the output signal level. The horizontal axis and the vertical axis are both linear axes. A switching button 18 for switching the display mode is arranged next to the graph of the tone curve characteristic. The state illustrated in FIG. 12 is referred to as a "linear display mode".

When the switching button 18 illustrated in FIG. 12 is pressed, the display mode is changed to the display mode illustrated in FIG. 13.

In FIG. 13, the horizontal axis represents the input signal level, the vertical axis represents the output signal level, and both the horizontal axis and the vertical axis are logarithmic axes. The switching button 18 for switching the display mode is arranged next to the graph of the tone curve characteristic. The state illustrated in FIG. 13 is referred to as a "logarithmic display mode".

When the switching button 18 is pressed, the display mode is changed to the linear display mode illustrated in FIG. 12. That is, the display mode of the tone curve characteristic is changed according to the operation of the operator.

By switching the type of axes between the linear axes and the logarithmic axes, even an operator who is accustomed to any display mode can perform appropriate tone adjustment.

4-2. Display Using Logarithmic Axes

A graph of a tone curve characteristic using logarithmic axes will be described.

Figure 14:
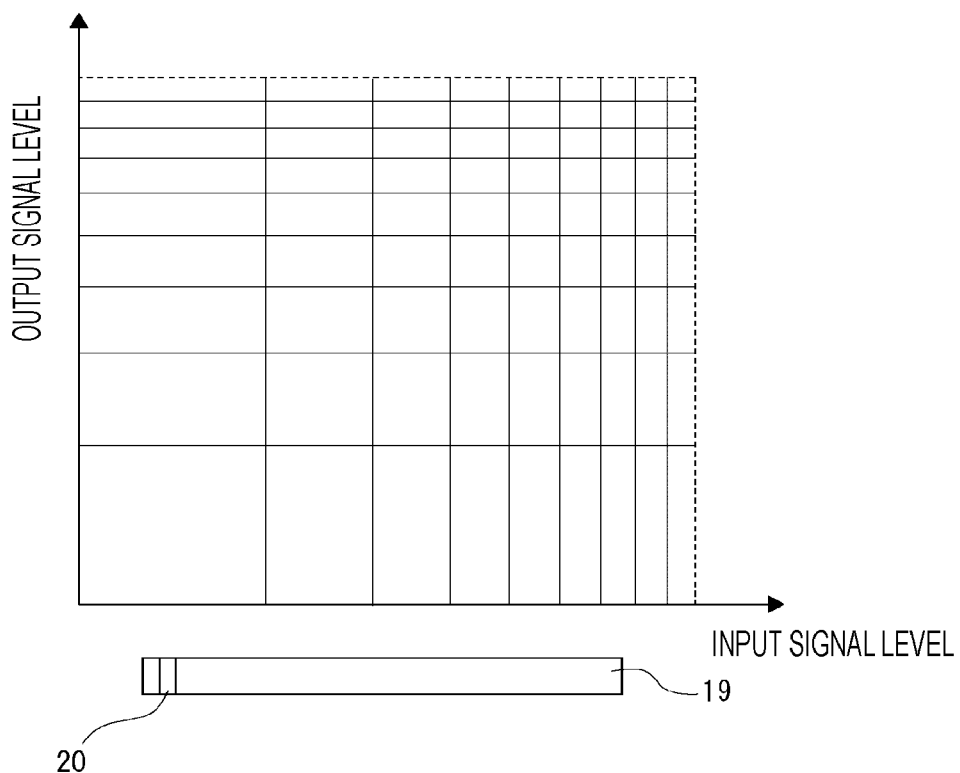
FIG. 14 is an explanatory diagram of display of a tone curve characteristic using logarithmic axes whose bases are changed.

The tone curve characteristic can be expressed by use of the logarithmic axes, for example, as illustrated in FIG. 14. However, in the state illustrated in FIG. 14, since a region in which the input signal level is high is compressed and displayed at the right end of the graph, there is a possibility that it may be difficult to operate a high luminance region.

As illustrated in FIG. 14, a scroll bar 19 and a knob 20 are arranged below the tone curve characteristic graph displayed on the display unit 16.

Figure 15:
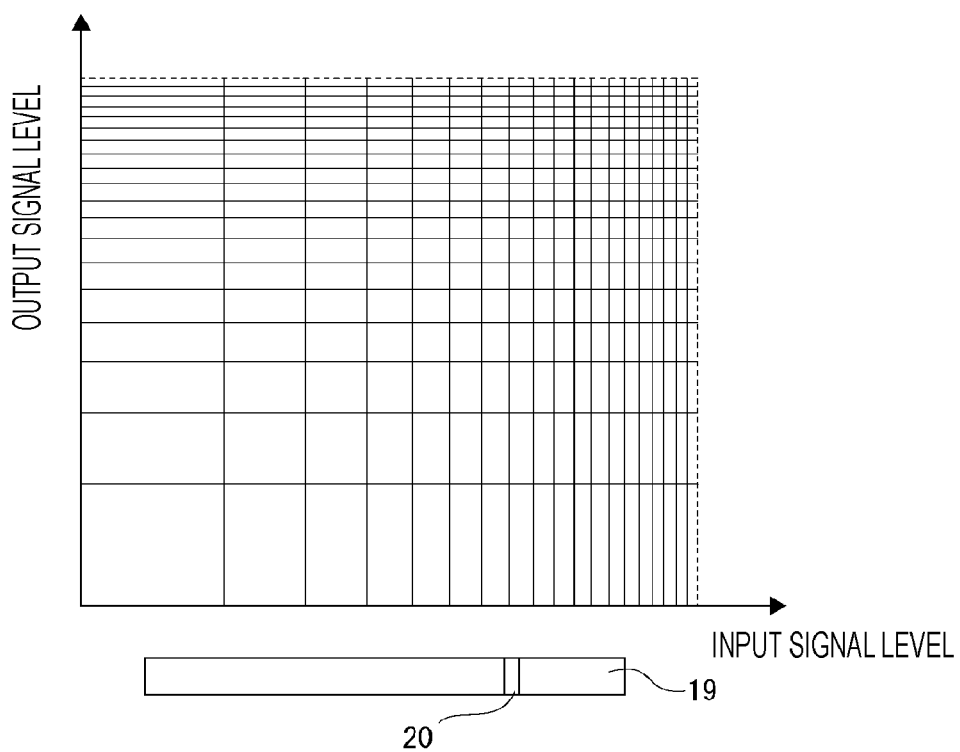
FIG. 15 is an explanatory diagram of display of the tone curve characteristic using the logarithmic axes whose bases are changed.

The horizontal position of the knob 20 on the scroll bar 19 is variable. FIG. 15 illustrates a state in which the knob 20 is moved rightward.

FIG. 15 illustrates the tone curve characteristic in a state where the bases of the logarithmic axes are changed by the knob 20 being moved.

When the base is changed, a low luminance display region is reduced, and instead the high luminance display region is enlarged. This display makes it easy to operate the high luminance region.

As described above, in the tone curve characteristic displayed on the display unit 16 of the present embodiment, any part can be enlarged and displayed by the base being changed.

4-3. Display of Target Region

The image processing system 1 is configured to be able to grasp the relationship between a luminance range of the tone curve characteristic displayed on the display unit 16 of the terminal device 3 and a display region of an output image displayed on the monitor device 4.

This configuration will be specifically described with reference to FIGS. 16 and 17.

Figure 16:
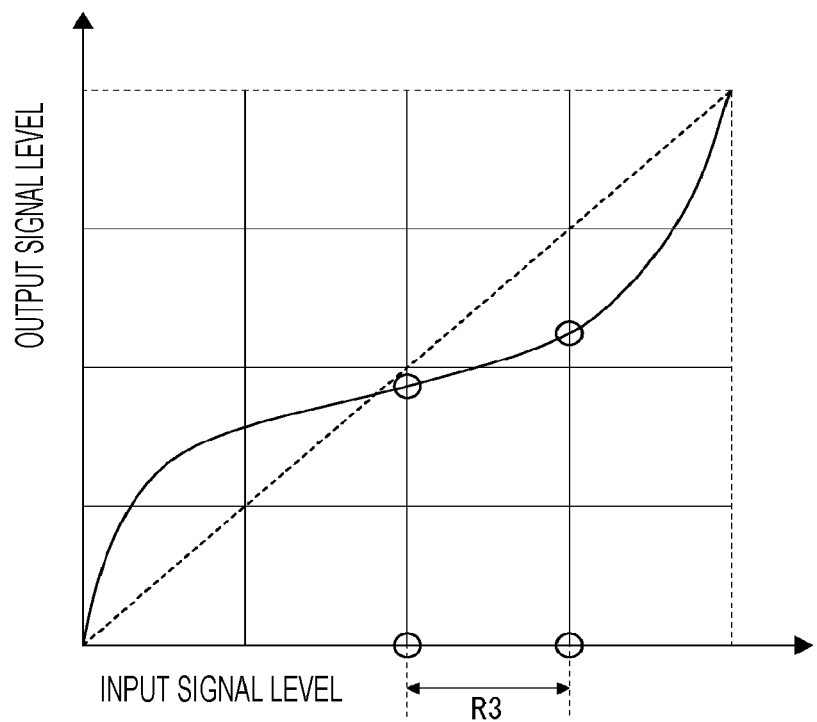
FIG. 16 is an explanatory diagram in a case where an adjustment target range is set in a tone curve characteristic.
Figure 17:
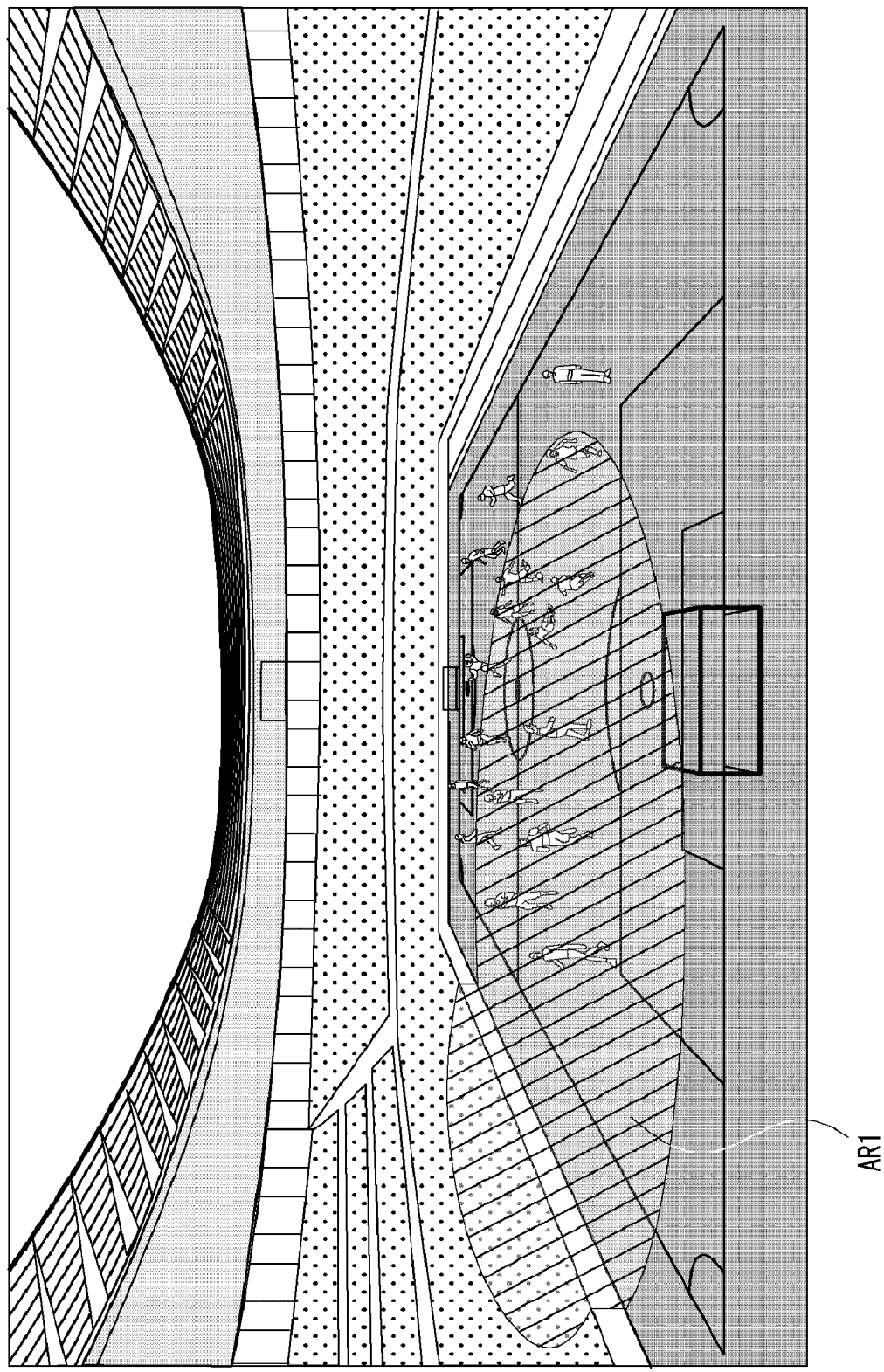
FIG. 17 is a diagram illustrating an example of a display image displayed on a monitor device and the adjustment target range.

FIG. 16 illustrates an example of the tone curve characteristic displayed on the display unit 16.

In the tone curve characteristic displayed on the display unit 16, a specific range R3 of the input signal level can be designated. The specific range is the adjustment target range R3.

In this state, it is difficult for the operator to grasp which region of the output image corresponds to the designated adjustment target range R3.

In the image processing system 1, a region corresponding to the adjustment target range R3 is indicated as a corresponding region AR1 hatched with oblique lines in the output image displayed on the monitor device 4. That is, the monitor device 4 has a marker function of marking an image region corresponding to the luminance range (adjustment target range R3) designated by the operator.

With this configuration, the operator can perform the work while grasping the correspondence relationship between the luminance region to be changed and the region of the output image.

Furthermore, after the region to be changed in the output image is determined, the adjustment target range R3 can be changed so that the region to be changed is included in the hatched region (corresponding region AR1). As a result, an operation of performing desired tone adjustment can be easily performed while the output image is checked.

Note that, in the example illustrated in FIG. 16, an example has been shown in which the specific range of the input signal level is the adjustment target range R3, but the specific range of the output signal level may be the adjustment target range R3.

5. Second Embodiment

Figure 18:
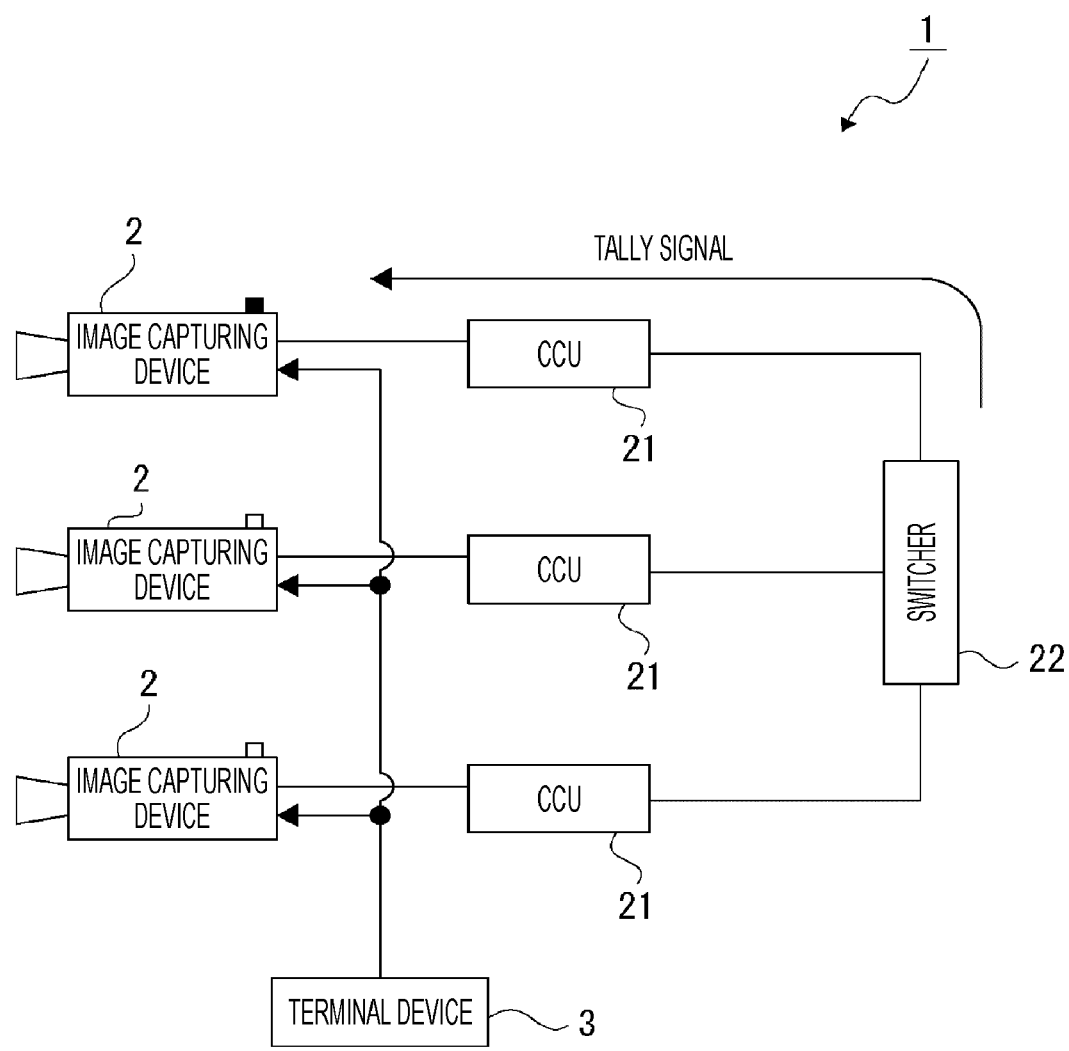
FIG. 18 is a diagram illustrating a configuration example of a second embodiment.

In a second embodiment, an image processing system 1 includes a plurality of image capturing devices 2, a plurality of camera control units (CCUs) 21, one switcher 22, and one terminal device 3 (see FIG. 18).

Each of the CCUs 21 is a device that transmits various instructions to a control unit 8 included in one of the image capturing devices 2. One CCU 21 is provided for each of the image capturing devices 2.

The switcher 22 transmits a tally signal to the image capturing device 2 used for broadcasting or recording via the CCU 21 that controls the image capturing device 2. That is, the switcher 22 switches the image capturing devices 2 by transmitting the tally signal to the image capturing device 2 selected by an operator's operation or the like via a corresponding one of the CCUs 21.

Each of the CCUs 21 transmits the tally signal received from the switcher 22 to the image capturing device 2 to be controlled. Furthermore, each of the CCUs 21 receives an image signal from the corresponding one of the image capturing devices 2 and transmits the image signal to the switcher 22.

Each of the CCUs 21 controls whether or not the terminal device 3 can perform tone adjustment. Specifically, the tone adjustment by the terminal device 3 is permitted in a period in which the tally signal is not transmitted to the image capturing device 2 to be controlled. Furthermore, in a period in which the tally signal is transmitted to the image capturing device 2 to be controlled, the tone adjustment by the terminal device 3 is not permitted or is restricted.

The terminal device 3 enables work for tone adjustment for the plurality of image capturing devices 2. Specifically, the setting values described above are transmitted to each of the terminal devices 3.

The terminal device 3 can simultaneously transmit the setting values to all the image capturing devices 2 in order to collectively perform tone adjustment for all the image capturing devices 2. Furthermore, in order to perform tone adjustment for a part of the image capturing devices 2, it is possible to transmit the setting values only for a specific one of the image capturing devices 2.

However, even if the setting values are transmitted to the image capturing device 2 receiving the tally signal, the tone adjustment based on the received setting values is invalidated on the side of the image capturing device 2. As a result, even if the operator performs the tone adjustment on the image capturing device 2 without considering whether or not the tally signal is being received, it is possible to prevent a change in a tone curve characteristic from being applied to the image capturing device 2 being used for broadcasting, and it is possible to avoid a trouble such as the image being broadcast being unintentionally changed.

Furthermore, since the terminal device 3 does not need to execute processing for confirming whether or not the tally signal is being received, the setting values can be transmitted to the image capturing device 2 designated by the operator regardless of whether or not the tally signal is being received, whereby the processing load is reduced.

Note that the CCUs 21 may transmit information that can specify the image capturing device 2 receiving the tally signal to the terminal device 3. As a result, the terminal device 3 can transmit the setting values to the other image capturing devices 2 except the image capturing device 2 receiving the tally signal.

Furthermore, the image capturing devices 2 may be configured to transmit flag information for specifying whether or not the tally signal is being received to the terminal device 3.

According to such a configuration of the image processing system 1, for example, it is possible to prevent a tone adjustment function from being inadvertently operated during recording of a television or the like, and the image on the air from being inappropriately varied.

6. Summary

As described in each of the above-described examples, an image processing system 1 includes: a setting value determination unit (control unit 17) that determines a setting value of a tone curve characteristic to be applied to a linear image signal having a linear characteristic according to an operation of a user; a tone adjustment unit 10 that applies the tone curve characteristic based on the determined setting value to the linear image signal; and an image signal output unit 11 that outputs, as an output image signal, an image signal after tone curve application obtained by application of the tone curve characteristic to the linear image signal.

Furthermore, the image processing system 1 may include: a setting value determination unit (control unit 17) that determines a setting value of a tone curve characteristic to be applied to an image signal having a linear characteristic according to an operation of a user (operator); a tone adjustment unit 10 that applies the tone curve characteristic based on the determined setting value to the image signal; and an image signal output unit 11 that outputs the image signal to which the tone curve characteristic is applied.

With this configuration, the output image signal reflecting the tone curve characteristic adjusted on the basis of the operation of the user is output.

Therefore, since an image changed by the tone adjustment work can be visually recognized, the tone adjustment work can be performed while the change in the image is checked.

Note that, as in each of the above-described examples, a gamma processing unit 13 and an OETF processing unit 14 are provided on the subsequent stage side of the tone adjustment unit 10, so that the output image signal subjected to the tone adjustment is generated as if the output image signal is a captured image signal captured in such an illumination environment, and is input to the gamma processing unit 13 and the OETF processing unit 14. As a result, for example, even in the case of capturing an image in an illumination environment that is not desired, the gamma processing unit 13 and the OETF processing unit 14 can perform conventional gamma processing and OETF processing on an image signal captured in a desired illumination environment.

Furthermore, since the tone control unit collectively performs tone adjustment without independently performing tone adjustment in each of the gamma processing unit 13 and the OETF processing unit 14, it is possible to reduce a work load.

The image processing system 1 may further include a nonlinear processing unit (the gamma processing unit 13 and the OETF processing unit 14) that performs nonlinear processing on an image signal obtained by application of the tone curve characteristic to the linear image signal, and outputs the image signal obtained by performing the nonlinear processing as the image signal after tone curve application, and the image signal output unit 11 may output the image signal after tone curve application as the output image signal.

Gamma correction, OETF processing, or the like is performed after the tone curve characteristic is applied, so that it is possible to generate a digital signal conforming to a video standard.

In the image processing system 1, the image signal having the linear characteristic may be a signal before nonlinear processing is performed.

Specifically, the nonlinear processing is, for example, gamma correction, OETF processing, or the like. As described above, a correction processing unit 9 performs various types of processing excluding nonlinear processing on an image signal output from an imaging element. Therefore, the input image signal input to the tone adjustment unit 10 is a signal maintaining the linear characteristic.

Since the nonlinear processing is performed in the subsequent stage of the tone adjustment unit 10, the signal input to the gamma processing unit 13 and the OETF processing unit 14 is a signal like a captured image signal captured under an illumination environment where a captured image signal with a desired tone can be obtained. As a result, it is possible to perform tone adjustment without worrying about gamma correction or OETF processing. In other words, it is possible to perform conventional gamma correction and OETF processing without performing gamma correction or OETF processing also serving as tone adjustment.

In the image processing system 1, the tone adjustment unit 10 may include a plurality of tone control units (for example, a first tone control unit, a second tone control unit 10b, and a third tone control unit 10c) as described with reference to FIG. 1 and the like.

Providing the plurality of tone control units makes it possible to selectively use the tone control units according to the purpose, and it is possible to secure ease of operation.

The image processing system 1 may include: a terminal device 3; and an image capturing device 2, the terminal device 3 may include an operation detection unit 15 that detects the operation for setting the setting value, the setting value determination unit (control unit 17), and a transmission control unit (control unit 17) that performs control to transmit the setting value, and the image capturing device 2 may include an image capturing unit 6 that captures an image, the tone adjustment unit 10, and the image signal output unit 11.

That is, the image processing system 1 includes the terminal device 3 that operates the tone curve characteristic and the image capturing device 2 that executes tone control processing of applying the tone curve characteristic according to the operation to an input image signal from the image capturing unit 6.

With this configuration, the operation on the tone curve characteristic can be received by the terminal device 3 different from the image capturing device 2, so that the processing load on the image capturing device 2 is reduced. That is, it is possible to increase the range of component selection depending on the performance of an arithmetic processing unit included in the image capturing device 2.

Furthermore, reducing the information amount of the setting value for specifying the tone curve characteristic calculated by the terminal device 3 makes it possible to reduce the amount of communication performed between the terminal device 3 and the image capturing device 2, and the performance required for a communication unit of each device can be reduced. This configuration can reduce the component cost. In addition, reducing the communication amount between the devices makes it possible to shorten a communication time, and the tone curve characteristic can be quickly applied. Furthermore, reducing the communication amount makes it possible to enhance the real-time property of reflection on a display image.

The image processing system 1 may further include a monitor device 4 that receives the output image signal from the image signal output unit 11 and displays an image.

The tone curve characteristic can be operated while the image displayed on the monitor device 4 is visually recognized.

With this configuration, since a change in an output image according to the operation of the tone curve characteristic can be checked, it is easy to set the tone curve characteristic for obtaining an output image with a desired tone.

The image signal output unit 11 in the image processing system 1 may output a first output image signal (for example, an HDR image signal) and a second output image signal (for example, an SDR image signal).

That is, the tone curve characteristic is applied to two different output image signals.

As a result, the tone curve characteristic can be applied even to the different output image signals.

In the image processing system 1, the first output image signal may be an image signal based on a first resolution (for example, a 4K resolution), and the second output image signal may be an image signal based on a second resolution (for example, an HD resolution) lower than the first resolution.

The tone curve characteristic is applied to two output image signals having different resolutions.

As a result, the tone curve characteristic can be applied even to the different output image signals having different resolutions.

The tone adjustment unit 10 in the image processing system 1 may perform tone adjustment on the first output image signal and the second output image signal by application of the tone curve characteristic.

With this configuration, the tone curve characteristic is applied to two different output image signals by one operation.

Therefore, it is not necessary to perform an operation for obtaining an output image signal with a desired tone for each output image signal, and it is possible to improve the efficiency of the tone adjustment work. In addition, it is possible to quickly provide an image to which a desired tone curve characteristic is applied.

The operation detection unit 15 in the image processing system 1 may detect an operation for setting the setting value, the operation designating a plurality of coordinates for performing curve interpolation.

With this configuration, the setting value calculation unit (control unit 17) generates the tone curve characteristic by application of linear interpolation to the plurality of designated coordinates.

Therefore, the tone adjustment work on the output image signal can be easily performed. Furthermore, as in each of the above-described examples, in an environment where the setting value for specifying the tone curve characteristic is transmitted from the terminal device 3 to the image capturing device 2, the amount of information to be transmitted is small, and thus it is not necessary to provide a high-performance communication unit in the terminal device 3 or the image capturing device 2, which can contribute to cost reduction. In addition, since the amount of information transmitted and received is small, the tone curve characteristic can be quickly applied by the tone control unit. Such a configuration is suitable, for example, in a case where it is desired to quickly apply the tone curve characteristic to the output image signal being broadcast.

The operation detection unit 15 in the image processing system 1 may detect an operation for setting the setting value, the operation designating a slope and an intercept of a logarithmic graph.

With this configuration, the setting value calculation unit (control unit 17) generates the tone curve characteristic specified by the slope and intercept of the logarithmic graph.

Therefore, the tone adjustment work on the output image signal can be easily performed. Furthermore, as in each of the above-described examples, in the environment where the setting value for specifying the tone curve characteristic is transmitted from the terminal device 3 to the image capturing device 2, the amount of information to be transmitted is small, and thus it is not necessary to provide a high-performance communication unit in the terminal device 3 or the image capturing device 2, which can contribute to cost reduction. In addition, since the amount of information transmitted and received is small, the tone curve characteristic can be quickly applied by the tone control unit. Such a configuration is suitable, for example, in a case where it is desired to quickly apply the tone curve characteristic to the output image signal being broadcast.

The operation detection unit 15 in the image processing system 1 may detect an operation for setting the setting value, the operation designating an adjustment point, an adjustment range, and an adjustment width of a signal level of an input image signal for specifying a curve shape in a graph of the tone curve characteristic expressed on a linear graph space.

With this configuration, the setting value calculation unit (control unit 17) generates the tone curve characteristic having the curve shape specified by the adjustment point, the adjustment range, and the adjustment width of the input signal level.

Therefore, the tone adjustment work on the output image signal can be easily performed. Furthermore, as in each of the above-described examples, in the environment where the setting value for specifying the tone curve characteristic is transmitted from the terminal device 3 to the image capturing device 2, the amount of information to be transmitted is small, and thus it is not necessary to provide a high-performance communication unit in the terminal device 3 or the image capturing device 2, which can contribute to cost reduction. In addition, since the amount of information transmitted and received is small, the tone curve characteristic can be quickly applied by the tone control unit. Such a configuration is suitable, for example, in a case where it is desired to quickly apply the tone curve characteristic to the output image signal being broadcast.

The image processing system 1 may further include a display unit 16 that displays the tone curve characteristic.

With this configuration, the operator who performs tone adjustment can visually recognize the tone curve characteristic.

Therefore, tone adjustment using a graphical work environment can be performed, and thus work is facilitated, which can improve work efficiency. Furthermore, since the tone curve characteristic on the display unit changes in real time according to the operation, it is easy to perform an intuitive operation, and the operator can immediately determine whether or not a correct operation has been performed.

Note that, as described above, providing the display unit 16 on the side of the terminal device 3 makes it possible to further improve the work efficiency.

The display unit 16 may be provided in the image capturing device 2.

The display unit 16 in the image processing system 1 may display a composite tone curve characteristic obtained by composition of a plurality of the tone curve characteristics.

With this configuration, in a case where the adjustment work is performed on the plurality of tone curve characteristics, it is possible to grasp the application result in a case where all the plurality of tone curve characteristics are applied.

Therefore, it is possible to efficiently generate an output image signal adjusted to have a desired tone.

The display unit 16 in the image processing system 1 may be switchable between a linear display mode in which the tone curve characteristic is displayed by use of a linear axis and a logarithmic display mode in which the tone curve characteristic is displayed by use of a logarithmic axis.

With this configuration, the display mode can be switched as necessary in a case where the adjustment work is performed on the tone curve characteristic.

Therefore, it is possible to improve the efficiency of the tone adjustment work and to easily obtain an output image signal adjusted to have a desired tone.

The image processing system 1 may further include the display unit 16 that is capable of displaying the tone curve characteristic and has a marker function of designating an adjustment target range in the tone curve characteristic, and the monitor device 4 may be capable of performing specific display of a pixel range (corresponding region AR1) corresponding to the adjustment target range R3.

That is, designating the adjustment range in the tone curve characteristic displayed on the display unit 16 makes it possible to visually recognize the pixel range corresponding to the adjustment range in the output image.

With this configuration, the tone curve characteristic can be adjusted while the pixel range to be adjusted is visually recognized, and it is possible to improve the efficiency of the tone adjustment work. Furthermore, it is possible to prevent unintended adjustment.

The tone adjustment unit 10 in the image processing system 1 may be configured not to change the tone curve characteristic to be applied to an input image signal in a case where a tally signal is being received.

With this configuration, in the image capturing device 2 receiving the tally signal, that is, the image capturing device 2 being used for broadcasting, the change in the tone curve characteristic is invalidated.

Therefore, it is possible to prevent the tone of the image being broadcast from changing, and it is possible to prevent a viewer from feeling difficulty in viewing.

Note that a configuration may be adopted in which a unit other than the tone control unit performs control so as not to change the tone curve characteristic to be applied to the input image signal in the case where the tally signal is being received. For example, in the case where the tally signal is being received, a control unit 8 of the image capturing device 2 may invalidate the change in the tone curve characteristic by not executing LUT update processing based on the received setting value. Alternatively, the control unit 17 of the terminal device 3 may be configured to be able to discriminate the image capturing device 2 receiving the tally signal, and may transmit the setting value of the tone curve characteristic changed by the operator to the image capturing device 2 only in a case where the image capturing device 2 is not receiving the tally signal.

Note that, in each of the above-described examples, an example has been described in which the display unit 16 is provided in the terminal device 3, but the display unit 16 may be provided in the image capturing device 2. Even if the display unit 16 is provided in the image capturing device 2, the operator can perform tone adjustment while visually recognizing the tone curve characteristic displayed on the display unit 16.

Furthermore, the display unit 16 may be provided in each of the image capturing device 2 and the terminal device 3.

As illustrated in FIG. 1, in each of the above-described examples, an example has been described in which the monitor device 4 performs image display based on the HDR image signal, but image display based on the SDR image signal may be performed.

Furthermore, both the HDR image and the SDR image may be displayed on the monitor device 4. With this configuration, it is possible to visually recognize how both the HDR image and the SDR image are changed by tone adjustment, and it is possible to improve the efficiency of the tone adjustment work.

Note that, although an example has been described in which the monitor device 4 is provided outside the image capturing device 2, the image capturing device 2 may include the monitor device 4. For example, the monitor device 4 may be a VF monitor or the like included in the image capturing device 2.

In each of the above-described configurations, an example has been described in which the information for tone adjustment transmitted and received between the control unit 8 of the image capturing device 2 and the control unit 17 of the terminal device 3 is the setting value.

In a case where the performance of the control unit 8 or a signal processing unit included in the image capturing device 2 is not high, an LUT may be generated in the control unit 17 of the terminal device 3, and the generated LUT (for example, an LUT including 500 points) may be transmitted from the terminal device 3 to the image capturing device 2.

With this configuration, processing of generating the LUT in the image capturing device 2 does not occur, and thus the processing load on the image capturing device 2 can be reduced.

Note that the effects described in the present specification are merely examples and are not limited, and other effects may be obtained.

7. Present Technology

The present technology can also adopt the following configurations.

(1)

An image processing system including:
  a setting value determination unit that determines a setting value of a tone curve characteristic to be applied to a linear image signal having a linear characteristic according to an operation of a user;
  a tone adjustment unit that applies the tone curve characteristic based on the determined setting value to the linear image signal; and
  an image signal output unit that outputs, as an output image signal, an image signal after tone curve application obtained by application of the tone curve characteristic to the linear image signal.

(2)

The image processing system according to (1), further including
  a nonlinear processing unit that performs nonlinear processing on an image signal obtained by application of the tone curve characteristic to the linear image signal, and outputs the image signal obtained by performing the nonlinear processing as the image signal after tone curve application, in which
  the image signal output unit outputs the image signal after tone curve application as the output image signal.

(3)

The image processing system according to (1) or (2), in which
  the image signal having the linear characteristic is a signal before nonlinear processing is performed.

(4)

The image processing system according to any one of (1) to (3), in which
  the tone adjustment unit includes a plurality of tone control units.

(5)

The image processing system according to any one of (1) to (4), further including:
  a terminal device; and an image capturing device, in which
  the terminal device includes an operation detection unit that detects the operation, the setting value determination unit, and a transmission control unit that performs control to transmit the setting value, and
  the image capturing device includes an image capturing unit that captures an image, the tone adjustment unit, and the image signal output unit.

(6)

The image processing system according to any one of (1) to (5), further including
  a monitor device that receives the output image signal from the image signal output unit and displays an image.

(7)

The image processing system according to any one of (1) to (6), in which
  the image signal output unit outputs a first output image signal and a second output image signal.

(8)

The image processing system according to (7), in which
  the first output image signal is an image signal based on a first resolution, and the second output image signal is an image signal based on a second resolution lower than the first resolution.

(9)

The image processing system according to (7) or (8), in which
the tone adjustment unit performs tone adjustment on the first output image signal and the second output image signal by application of the tone curve characteristic.

(10)

The image processing system according to any one of (1) to (9), further including
an operation detection unit that detects an operation for setting the setting value, the operation designating a plurality of coordinates for performing curve interpolation.

(11)

The image processing system according to any one of (1) to (10), further including
an operation detection unit that detects an operation for setting the setting value, the operation designating a slope and an intercept of a logarithmic graph.

(12)

The image processing system according to any one of (1) to (11), further including
an operation detection unit that detects an operation for setting the setting value, the operation designating an adjustment point, an adjustment range, and an adjustment width of a signal level of an input image signal for specifying a curve shape in a graph of the tone curve characteristic expressed on a linear graph space.

(13)

The image processing system according to any one of (1) to (12), further including
a display unit that displays the tone curve characteristic.

(14)

The image processing system according to (13), in which
the display unit displays a composite tone curve characteristic obtained by composition of a plurality of the tone curve characteristics.

(15)

The image processing system according to (13) or (14), in which
the display unit is switchable between a linear display mode in which the tone curve characteristic is displayed by use of a linear axis and a logarithmic display mode in which the tone curve characteristic is displayed by use of a logarithmic axis.

(16)

The image processing system according to (6), further including
a display unit that is capable of displaying the tone curve characteristic and has a marker function of designating an adjustment target range in the tone curve characteristic, in which
the monitor device is capable of performing specific display of a pixel range corresponding to the adjustment target range.

(17)

The image processing system according to any one of (1) to (16), in which
the tone adjustment unit does not change the tone curve characteristic to be applied to an input image signal in a case where a tally signal is being received.

(18)

An information processing device including:
a setting value determination unit that determines a setting value of a tone curve characteristic to be applied to a linear image signal having a linear characteristic according to an operation of a user; and
a transmission control unit that performs control to transmit the setting value.

(19)

An image capturing device including:
an image capturing unit;
a tone adjustment unit that applies a tone curve characteristic specified on the basis of a setting value transmitted from an external information processing device to a linear image signal obtained by the image capturing unit capturing an image, the linear image signal having a linear characteristic; and
an image signal output unit that outputs, as an output image signal, an image signal after tone curve application obtained by application of the tone curve characteristic to the linear image signal.

(20)

An image processing device including:
a tone adjustment unit that applies a tone curve characteristic specified on the basis of a setting value transmitted from an external information processing device to a linear image signal having a linear characteristic; and
an image signal output unit that outputs, as an output image signal, an image signal after tone curve application obtained by application of the tone curve characteristic to the linear image signal.

REFERENCE SIGNS LIST

1 Image processing system
2 Image capturing device
3 Terminal device
4 Monitor device
6 Image capturing unit
8 Control unit
10a First tone control unit
10b Second tone control unit
10c Third tone control unit
13 Gamma processing unit
14 OETF processing unit
15 Operation detection unit
16 Display unit
17 Control unit

The invention claimed is:

1. An image processing system, comprising:
setting value determination circuitry configured to determine a setting value of a tone curve characteristic to be applied to a linear image signal having a linear characteristic, the setting value being determined according to an operation of a user;
processing circuitry configured to
apply the tone curve characteristic based on the determined setting value to the linear image signal, the linear image signal being a signal to which nonlinear processing, including gamma processing, on the luminance values has not been performed, to generate an intermediate image signal, the intermediate image signal maintaining a linearity of the luminance values;
perform the nonlinear processing, including one of the gamma processing and opto-electronic transfer function (OETF) processing, on the intermediate image signal obtained by application of the tone curve characteristic to the linear image signal, and
output, as an output image signal, an image signal obtained by performing the nonlinear processing.

2. The image processing system according to claim 1, wherein the processing circuitry includes a plurality of tone control processing circuits.

3. The image processing system according to claim 1, further comprising:
a terminal device; and
an image capturing device, wherein
the terminal device includes operation detection circuitry that detects the operation, the setting value determination circuitry, and transmission control circuitry configured to perform control to transmit the setting value, and
the image capturing device includes an image capturing sensor that captures an image and the processing circuitry.

4. The image processing system according to claim 1, further comprising a monitor that receives the output image signal from the processing circuitry and displays an image based on the output image signal.

5. The image processing system according to claim 1, wherein the processing circuitry is further configured to output a first output image signal and a second output image signal.

6. The image processing system according to claim 5, wherein the first output image signal is an image signal based on a first resolution, and the second output image signal is an image signal based on a second resolution lower than the first resolution.

7. The image processing system according to claim 5, wherein the processing circuitry is further configured to perform tone adjustment on the first output image signal and the second output image signal by application of the tone curve characteristic.

8. The image processing system according to claim 1, further comprising operation detection circuitry configured to detect the operation for setting the setting value, the operation designating a plurality of coordinates for performing curve interpolation.

9. The image processing system according to claim 1, further comprising operation detection circuitry configured to detect an operation for setting the setting value, the operation designating a slope and an intercept of a logarithmic graph.

10. The image processing system according to claim 1, further comprising operation detection circuitry configured to detect an operation for setting the setting value, the operation designating an adjustment point, an adjustment range, and an adjustment width of a signal level of an input image signal for specifying a curve shape in a graph of the tone curve characteristic expressed on a linear graph space.

11. The image processing system according to claim 1, further comprising a display that displays the tone curve characteristic.

12. The image processing system according to claim 11, wherein the display displays a composite tone curve characteristic obtained by composition of a plurality of the tone curve characteristics.

13. The image processing system according to claim 11, wherein the display is switchable between a linear display mode in which the tone curve characteristic is displayed by use of a linear axis and a logarithmic display mode in which the tone curve characteristic is displayed by use of a logarithmic axis.

14. The image processing system according to claim 4, further comprising a display that displays the tone curve characteristic and has a marker function of designating an adjustment target range in the tone curve characteristic, wherein
the monitor is configured to perform a specific display of a pixel range corresponding to the adjustment target range.

15. The image processing system according to claim 1, wherein the processing circuitry does not change the tone curve characteristic to be applied to an input image signal when a tally signal is being received.

16. An image capturing device, comprising:
an image capturing sensor;
processing circuitry configured to
apply a tone curve characteristic specified based on a setting value, transmitted from an external information processing device, to a linear image signal obtained by the image capturing sensor capturing an image, the linear image signal having a linear characteristic, the linear image signal being a signal to which nonlinear processing, including gamma processing, on the luminance values has not been performed, to generate an intermediate image signal, the intermediate image signal maintaining a linearity of the luminance values;
perform the nonlinear processing, including one of the gamma processing and opto-electronic transfer function (OETF) processing, on the intermediate image signal obtained by application of the tone curve characteristic to the linear image signal; and
output, as an output image signal, an image signal obtained by performing the nonlinear processing.

17. An image processing device, comprising:
processing circuitry configured to:
apply a tone curve characteristic specified based on a setting value, transmitted from an external information processing device, to a linear image signal having a linear characteristic, the linear image signal being a signal to which nonlinear processing, including gamma processing, on the luminance values has not been performed, to generate an intermediate image signal, the intermediate image signal maintaining a linearity of the luminance values;
perform the nonlinear processing, including one of the gamma processing and opto-electronic transfer function (OETF) processing, on the intermediate image signal obtained by application of the tone curve characteristic to the linear image signal; and
output, as an output image signal, an image signal obtained by performing the nonlinear processing.

* * * * *